United States Patent
Arise et al.

(10) Patent No.: US 10,707,517 B2
(45) Date of Patent: *Jul. 7, 2020

(54) NONAQUEOUS ELECTROLYTE SECONDARY BATTERY

(71) Applicant: Sumitomo Chemical Company, Limited, Tokyo (JP)

(72) Inventors: Ichiro Arise, Osaka (JP); Toshihiko Ogata, Osaka (JP); Chikara Murakami, Osaka (JP); Hiroki Hashiwaki, Niihama (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 35 days.

This patent is subject to a terminal disclaimer.

(21) Appl. No.: 16/224,157

(22) Filed: Dec. 18, 2018

(65) Prior Publication Data

US 2019/0190056 A1    Jun. 20, 2019

(30) Foreign Application Priority Data

Dec. 19, 2017 (JP) .................... 2017-243284

(51) Int. Cl.
  H01M 10/05 (2010.01)
  H01M 2/16 (2006.01)
  (Continued)

(52) U.S. Cl.
  CPC ............. H01M 10/05 (2013.01); H01M 2/16 (2013.01); H01M 2/1686 (2013.01); H01M 4/13 (2013.01);
  (Continued)

(58) Field of Classification Search
  CPC ...... H01M 10/05; H01M 2/16; H01M 2/1686; H01M 4/13; H01M 4/131; H01M 4/133; H01M 4/583; H01M 4/505; H01M 4/525
  See application file for complete search history.

(56) References Cited

U.S. PATENT DOCUMENTS

2013/0089770 A1    4/2013  Nishikawa
2017/0155113 A1    6/2017  Hashiwaki et al.
(Continued)

FOREIGN PATENT DOCUMENTS

JP    2005222773 A    8/2005
JP    2012104422 A    5/2012
(Continued)

OTHER PUBLICATIONS

Office Action dated Apr. 3, 2018 in JP Application No. 2017243284 (Partial English Translation).
(Continued)

*Primary Examiner* — Helen Oi K Conley
(74) *Attorney, Agent, or Firm* — Panitch Schwarze Belisario & Nadel LLP

(57) ABSTRACT

A nonaqueous electrolyte secondary battery in accordance with an embodiment of the present invention includes: a separator including a polyolefin porous film; a porous layer containing a polyvinylidene fluoride-based resin; and a positive electrode plate and a negative electrode plate each of which has a capacitance in a specific range, the polyolefin porous film having a parameter X of not more than 20, and the polyvinylidene fluoride-based resin containing not less than 35.0 mol % of an α-form polyvinylidene fluoride-based resin.

6 Claims, 2 Drawing Sheets

(51) Int. Cl.
    *H01M 4/131* (2010.01)
    *H01M 4/583* (2010.01)
    *H01M 4/133* (2010.01)
    *H01M 4/13* (2010.01)
    *H01M 4/525* (2010.01)
    *H01M 4/505* (2010.01)

(52) U.S. Cl.
    CPC .......... *H01M 4/131* (2013.01); *H01M 4/133* (2013.01); *H01M 4/583* (2013.01); *H01M 4/505* (2013.01); *H01M 4/525* (2013.01)

(56) References Cited

U.S. PATENT DOCUMENTS

2017/0263905 A1    9/2017    Ogata et al.
2017/0365835 A1    12/2017   Ogata et al.
2017/0365836 A1    12/2017   Ogata et al.

FOREIGN PATENT DOCUMENTS

| | | |
|---|---|---|
| JP | 2012256528 A | 12/2012 |
| JP | 5432417 B2 | 3/2014 |
| JP | 2016071969 A | 5/2016 |
| JP | 6025957 B1 | 11/2016 |
| JP | 2017103041 A | 6/2017 |
| JP | 2017103209 A | 6/2017 |
| JP | 2017168419 A | 9/2017 |
| JP | 2017226117 A | 12/2017 |
| JP | 2017226120 A | 12/2017 |

OTHER PUBLICATIONS

Office Action dated Apr. 3, 2018 in JP Application No. 2017243277 (Partial English Translation).

NONAQUEOUS ELECTROLYTE SECONDARY BATTERY

This Nonprovisional application claims priority under 35 U.S.C. § 119 on Patent Application No. 2017-243284 filed in Japan on Dec. 19, 2017, the entire contents of which are hereby incorporated by reference.

TECHNICAL FIELD

The present invention relates to a nonaqueous electrolyte secondary battery.

BACKGROUND ART

Nonaqueous electrolyte secondary batteries, particularly lithium secondary batteries, have a high energy density, and are therefore in wide use as batteries for use in devices such as a personal computer, a mobile telephone, and a portable information terminal. Such lithium secondary batteries have recently been developed as on-vehicle batteries.

Patent Literature 1 discloses, as such a nonaqueous electrolyte secondary battery, a nonaqueous electrolyte secondary battery including a nonaqueous electrolyte secondary battery separator which contains a polyolefin porous film having a small amount of anisotropy of tan δ obtained by measurement of viscoelasticity.

CITATION LIST

[Patent Literature 1] Japanese Patent No. 6025957 (Registered on Oct. 21, 2016)

SUMMARY OF INVENTION

Technical Problem

Though the above-described conventional nonaqueous electrolyte secondary battery reduces a rate at which an internal resistance of the nonaqueous electrolyte secondary battery increases, the above-described conventional nonaqueous electrolyte secondary battery still has a room for further improvement as a nonaqueous electrolyte secondary battery, from the viewpoint of a high-rate characteristic.

An object of an aspect of the present invention is to provide a nonaqueous electrolyte secondary battery which is excellent in discharge capacity characteristic in high-rate discharge.

Solution to Problem

A nonaqueous electrolyte secondary battery in accordance with Aspect 1 of the present invention includes: a nonaqueous electrolyte secondary battery separator including a polyolefin porous film; a porous layer containing a polyvinylidene fluoride-based resin; a positive electrode plate having a capacitance of not less than 1 nF and not more than 1000 nF per measurement area of 900 mm$^2$; and a negative electrode plate having a capacitance of not less than 4 nF and not more than 8500 nF per measurement area of 900 mm$^2$, the polyolefin porous film having a parameter X of not more than 20, the parameter X being calculated in accordance with the following expression:

$$X=100\times|\text{MD tan }\delta - \text{TD tan }\delta|/\{(\text{MD tan }\delta + \text{TD tan }\delta)/2\}$$

where MD tan δ represents a tan δ in a machine direction and TD tan δ represents a tan δ in a transverse direction, the tan δ in the machine direction and the tan δ in the transverse direction each being obtained through a viscoelasticity measurement performed at a frequency of 10 Hz and at a temperature of 90° C., the porous layer being provided between the nonaqueous electrolyte secondary battery separator and at least one of the positive electrode plate and the negative electrode plate, the polyvinylidene fluoride-based resin contained in the porous layer containing an α-form polyvinylidene fluoride-based resin and a β-form polyvinylidene fluoride-based resin, a content of the α-form polyvinylidene fluoride-based resin being not less than 35.0 mol % with respect to 100 mol % of a total content of the α-form polyvinylidene fluoride-based resin and the β-form polyvinylidene fluoride-based resin in the polyvinylidene fluoride-based resin, the content of the α-form polyvinylidene fluoride-based resin being calculated by (a) waveform separation of (α/2) observed at around −78 ppm in a $^{19}$F-NMR spectrum obtained from the porous layer and (b) waveform separation of {(α/2)+β} observed at around −95 ppm in the $^{19}$F-NMR spectrum obtained from the porous layer.

Further, a nonaqueous electrolyte secondary battery in accordance with Aspect 2 of the present invention is arranged such that in the above Aspect 1, the positive electrode plate contains a transition metal oxide.

Further, a nonaqueous electrolyte secondary battery in accordance with Aspect 3 of the present invention is arranged such that in the above Aspect 1 or 2, the negative electrode plate contains graphite.

Further, a nonaqueous electrolyte secondary battery in accordance with Aspect 4 of the present invention is arranged to further include, in any one of Aspects 1 through 3, another porous layer which is provided between (i) the nonaqueous electrolyte secondary battery separator and (ii) at least one of the positive electrode plate and the negative electrode plate.

Further, a nonaqueous electrolyte secondary battery in accordance with Aspect 5 of the present invention is arranged such that in Aspect 4, the another porous layer contains at least one kind of resin selected from the group consisting of polyolefins, (meth)acrylate-based resins, fluorine-containing resins (excluding polyvinylidene fluoride-based resins), polyamide-based resins, polyester-based resins and water-soluble polymers.

Further, a nonaqueous electrolyte secondary battery in accordance with Aspect 6 of the present invention is arranged such that in Aspect 5, the polyamide-based resin is an aramid resin.

Advantageous Effects of Invention

An aspect of the present invention makes it possible to provide a nonaqueous electrolyte secondary battery which is excellent in discharge capacity characteristic in high-rate discharge.

DESCRIPTION OF EMBODIMENTS

Figure 1:
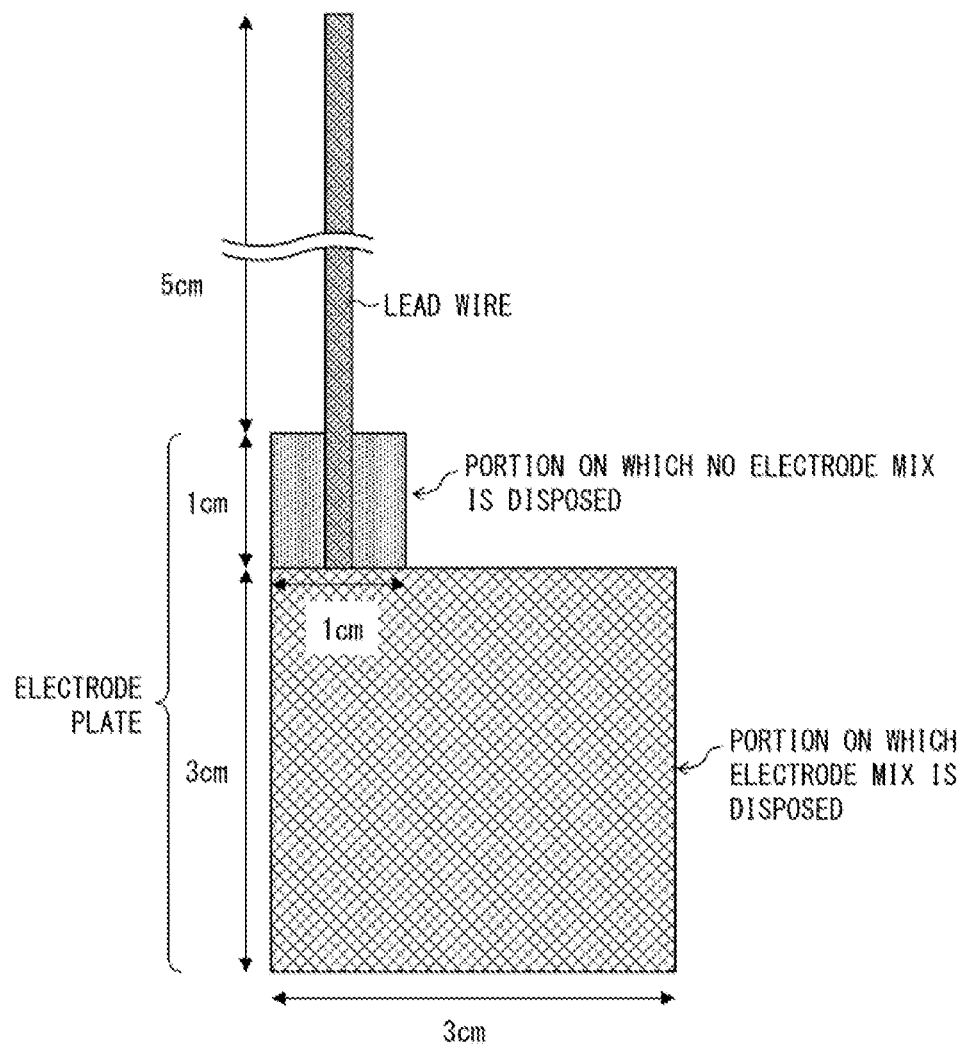
FIG. 1 is a view schematically illustrating a measurement target electrode whose capacitance was to be measured in Examples of the present application.

The following description will discuss an embodiment of the present invention. Note, however, that the present invention is not limited to the embodiment. The present invention is not limited to arrangements described below, but may be altered in various ways by a skilled person within the scope of the claims. Any embodiment based on a proper combination of technical means disclosed in different embodiments is also encompassed in the technical scope of the present invention. Note that a numerical expression "A to B" herein means "not less than A and not more than B" unless otherwise stated.

A nonaqueous electrolyte secondary battery in accordance with an embodiment of the present invention includes: a separator for a nonaqueous electrolyte secondary battery (hereinafter, also referred to as "nonaqueous electrolyte secondary battery separator" or "separator") including a polyolefin porous film; a porous layer containing a polyvinylidene fluoride-based resin (hereinafter, also referred to as "PVDF-based resin"); a positive electrode plate having a capacitance of not less than 1 nF and not more than 1000 nF per measurement area of 900 mm², and a negative electrode plate having a capacitance of not less than 4 nF and not more than 8500 nF per measurement area of 900 mm², the polyolefin porous film having a parameter X of not more than 20, the parameter X being calculated in accordance with the following expression:

$$X = 100 \times |MD \tan \delta - TD \tan \delta| / \{(MD \tan \delta + TD \tan \delta)/2\}$$

where MD tan δ represents a tan δ in a machine direction and TD tan δ represents a tan δ in a transverse direction, the tan δ in the machine direction and the tan δ in the transverse direction each being obtained through a viscoelasticity measurement performed at a frequency of 10 Hz and at a temperature of 90° C., the porous layer being provided between the nonaqueous electrolyte secondary battery separator and at least one of the positive electrode plate and the negative electrode plate, the polyvinylidene fluoride-based resin contained in the porous layer containing an α-form polyvinylidene fluoride-based resin and a β-form polyvinylidene fluoride-based resin, a content of the α-form polyvinylidene fluoride-based resin being not less than 35.0 mol % with respect to 100 mol % of a total content of the α-form polyvinylidene fluoride-based resin and the β-form polyvinylidene fluoride-based resin in the polyvinylidene fluoride-based resin, the content of the α-form polyvinylidene fluoride-based resin being calculated by (a) waveform separation of (α/2) observed at around −78 ppm in a $^{19}$F-NMR spectrum obtained from the porous layer and (b) waveform separation of {(α/2)+β} observed at around −95 ppm in the $^{19}$F-NMR spectrum obtained from the porous layer.

The term "measurement area" herein means an area of a portion of a measurement electrode (upper (main) electrode or probe electrode) of an LCR meter which portion is in contact with a measurement target (a positive electrode plate, or a negative electrode plate) in a case where a capacitance is measured by a method for measuring a capacitance (later described). Therefore, a value of a capacitance per measurement area of Y mm² means a value obtained in a case where a capacitance is measured with use of an LCR meter while a measurement target and a measurement electrode are in contact with each other such that an area of a portion of the measurement electrode which portion is in contact with the measurement target is Y mm².

<Capacitance>

In the present specification, a value of the capacitance of the positive electrode plate is a value measured by a method for measuring a capacitance of an electrode plate (later described), that is, a value measured while a measurement electrode (probe electrode) is in contact with a surface of the positive electrode plate which surface is located on a positive electrode active material layer side. The capacitance of the positive electrode plate mainly indicates a polarization state of a positive electrode active material layer of the positive electrode plate.

In the present specification, a value of the capacitance of the negative electrode plate is a value measured by the method for measuring a capacitance of an electrode plate (later described), that is, a value measured while the measurement electrode is in contact with a surface of the negative electrode plate which surface is located on a negative electrode active material layer side. The capacitance of the negative electrode plate mainly indicates a polarization state of a negative electrode active material layer of the negative electrode plate.

In the nonaqueous electrolyte secondary battery, ions which are charge carriers are released from the negative electrode plate when the nonaqueous electrolyte secondary battery is discharged. The ions thus released pass through the nonaqueous electrolyte secondary battery separator, and are then taken into the positive electrode plate. In so doing, the ions are solvated, by an electrolyte solvent, in the negative electrode plate and at a surface of the negative electrode plate, and are desolvated in the positive electrode plate and at a surface of the positive electrode plate. The ions are, for example, $Li^+$ when the nonaqueous electrolyte secondary battery is a lithium-ion secondary battery.

Accordingly, a degree to which the ions are solvated is dependent on the polarization state of the negative electrode active material layer of the negative electrode plate. Meanwhile, a degree to which the ions are desolvated is dependent on the polarization state of the positive electrode active material layer of the positive electrode plate.

It is therefore possible to appropriately promote the above-described solvation, by controlling the capacitance of each of the negative electrode plate and the positive electrode plate to a capacitance within a suitable range, that is, by adjusting the polarization state of each of the negative electrode active material layer and the positive electrode active material layer to a suitable state. This makes it possible to not only improve permeability of the ions as charge carriers but also to enhance a discharge output characteristic of the nonaqueous electrolyte secondary battery, particularly in a case where a large discharge electric current, of which hour rate is not less than 20 C, is applied to the nonaqueous electrolyte secondary battery. In light of the above, the negative electrode plate included in the nonaqueous electrolyte secondary battery in accordance with an embodiment of the present invention has a capacitance of not less than 4 nF and not more than 8500 nF, preferably not less than 4 nF and not more than 3000 nF, and more preferably not less than 4 nF and not more than 2600 nF, per measurement area of 900 mm². Note that a lower limit of the capacitance can be not less than 100 nF, not less than 200 nF, or not less than 1000 nF.

Specifically, in a case where the negative electrode plate has a capacitance of less than 4 nF per measurement area of 900 mm², polarizability of the negative electrode plate is so low that the negative electrode plate hardly contributes to promotion of the above-described solvation. Therefore, the nonaqueous electrolyte secondary battery including such a negative electrode plate does not have an enhanced output characteristic. On the other hand, in a case where the negative electrode plate has a capacitance of more than 8500 nF per measurement area of 900 mm², the polarizability of the negative electrode plate is so high that compatibility between (i) inner walls of voids in the negative electrode plate and (ii) the ions becomes excessively high. This prevents movement (release) of the ions from the negative electrode plate. Therefore, the nonaqueous electrolyte secondary battery including such a negative electrode plate rather has a low output characteristic.

Further, in view of the above, the positive electrode plate included in the nonaqueous electrolyte secondary battery in accordance with an embodiment of the present invention has a capacitance of not less than 1 nF and not more than 1000 nF, preferably not less than 2 nF and not more than 600 nF, and more preferably not less than 2 nF and not more than 400 nF, per measurement area of 900 mm$^2$. Note that a lower limit of the capacitance can be not less than 3 nF.

Specifically, in a case where the positive electrode plate has a capacitance of less than 1 nF per measurement area of 900 mm$^2$, polarizability of the positive electrode plate is so low that the positive electrode plate hardly contributes to the above-described desolvation. Therefore, the nonaqueous electrolyte secondary battery including such a positive electrode plate does not have an enhanced output characteristic. On the other hand, in a case where the positive electrode plate has a capacitance of more than 1000 nF per measurement area of 900 mm$^2$, the polarizability of the positive electrode plate is so high that the desolvation is excessively advanced. Accordingly, the electrolyte solvent for the ions to move inside the positive electrode plate is desolvated, and compatibility between (i) inner walls of voids in the positive electrode plate and (ii) the ions which have been desolvated becomes excessively high. This prevents movement of the ions inside the positive electrode plate. Therefore, the nonaqueous electrolyte secondary battery including such a positive electrode plate rather has a low output characteristic.

<Method for Adjusting Capacitance>

It is possible to control the capacitance of the positive electrode plate by adjusting a surface area of the positive electrode active material layer. Similarly, it is possible to control the capacitance of the negative electrode plate by adjusting a surface area of the negative electrode active material layer. Specifically, by, for example, rubbing a surface of each of the positive electrode active material layer and the negative electrode active material layer with use of an abrasive paper or the like, it is possible to increase the surface area of each of the positive electrode active material layer and the negative electrode active material layer. This ultimately makes it possible to increase the capacitance of each of the positive electrode plate and the negative electrode plate. Alternatively, it is possible to adjust the capacitance of the positive electrode plate by adjusting a relative dielectric constant of a material of which the positive electrode plate is made, and it is possible to control the capacitance of the negative electrode plate by adjusting a relative dielectric constant of a material of which the negative electrode plate is made. The relative dielectric constant can be adjusted by changing shapes of the voids, a porosity, and distribution of the voids of each of the positive electrode plate and the negative electrode plate. The relative dielectric constant can be alternatively controlled by adjusting the material of which each of the positive electrode plate and the negative electrode plate is made.

<Method for Measuring Capacitance of Electrode Plate>

According to an embodiment of the present invention, the capacitance of each of the positive electrode and the negative electrode plate (hereinafter each also referred to as "electrode plate") per measurement area of 900 mm$^2$ is measured with use of an LCR meter. Measurement is carried out at a frequency of 300 KHz while measurement conditions are set as follows: CV: 0.010 V, SPEED: SLOW2, AVG: 8, CABLE: 1 m, OPEN: All, SHORT: All DCBIAS 0.00 V.

In the above measurements of the capacitance, the electrode plate which has not yet been included in the nonaqueous electrolyte secondary battery is measured. Note that a value of a capacitance is a unique value determined depending on a shape (surface area) of a solid insulating material (the electrode plate), a material of which the solid insulating material is made, shapes of voids in the solid insulating material, a porosity of the solid insulating material, distribution of the voids, and the like. Therefore, the value of the capacitance of the electrode plate which has been included in the nonaqueous electrolyte secondary battery is equivalent to that of the capacitance of the electrode plate which has not yet been included in the nonaqueous electrolyte secondary battery.

Note that the capacitance of each of the positive electrode plate and the negative electrode plate can be measured after (i) the positive electrode plate and the negative electrode plate are included in the nonaqueous electrolyte secondary battery, (ii) the nonaqueous electrolyte secondary battery is charged and discharged, and then (iii) the positive electrode plate and the negative electrode plate are taken out from the nonaqueous electrolyte secondary battery. Specifically, for example, an electrode laminated body (a member for a nonaqueous electrolyte secondary battery (hereinafter referred to as "nonaqueous electrolyte secondary battery member")) is taken out from an external member of the nonaqueous electrolyte secondary battery, and is dismantled to take out one electrode plate (the positive electrode plate or the negative electrode plate). From the one electrode plate thus taken out, a test piece is cut off which has a size similar to that of the electrode plate serving as a measurement target in the above-described method for measuring a capacitance of an electrode plate. Subsequently, the test piece thus obtained is cleaned several times (for example, three times) in diethyl carbonate (hereinafter, also referred to as "DEC"). The cleaning is a step of removing an electrolyte, a product of decomposition of the electrolyte, a lithium salt, and the like, each adhering to a surface of the electrode plate, by (i) putting and cleaning the test piece in the DEC and then (ii) repeating, several times (for example, three times), a procedure of replacing the DEC with new DEC and cleaning the test piece in the new DEC. The electrode plate which has been cleaned is sufficiently dried, and is then used as a measurement target electrode. A type of the external member of the nonaqueous electrolyte secondary battery, from which external member the electrode laminated body is taken out, is not limited to any particular type. Similarly, a structure of the electrode laminated body, from which the electrode plate is taken out, is not limited to any particular structure.

<Nonaqueous Electrolyte Secondary Battery Separator>

The nonaqueous electrolyte secondary battery separator for an embodiment of the present invention includes a polyolefin porous film. Note that in the following description, the polyolefin porous film may also be referred to as "porous film".

The porous film alone can be a nonaqueous electrolyte secondary battery separator. Further, the porous film can be a base material for a laminated separator for a nonaqueous electrolyte secondary battery (hereinafter referred to as "nonaqueous electrolyte secondary battery laminated separator") in which a porous layer (described later) is provided. The porous film contains a polyolefin-based resin as a main component and has therein many pores connected to one another, so that a gas and a liquid can pass through the polyolefin porous film from one surface to the other.

In the nonaqueous electrolyte secondary battery separator for an embodiment of the present invention, a porous layer containing a polyvinylidene fluoride-based resin (described later) can be disposed on at least one surface of the nonaqueous electrolyte secondary battery separator. In this case, a laminated body including the porous layer disposed on at least one surface of the nonaqueous electrolyte secondary battery separator is herein referred to as "nonaqueous electrolyte secondary battery laminated separator" or "laminated separator." A nonaqueous electrolyte secondary battery separator for an embodiment of the present invention may further include another layer(s) such as an adhesive layer, a heat-resistant layer, a protective layer, and/or the like, in addition to the polyolefin porous film.

(Polyolefin Porous Film)

The porous film contains polyolefin in a proportion of not less than 50% by volume, preferably not less than 90% by volume, and more preferably not less than 95% by volume, with respect to a whole of the porous film. The polyolefin more preferably contains a high molecular weight component having a weight-average molecular weight of $5 \times 10^5$ to $15 \times 10^6$. In particular, the polyolefin more preferably contains a high molecular weight component having a weight-average molecular weight of not less than 1,000,000 because a strength of a resultant nonaqueous electrolyte secondary battery separator improves.

Specific examples of the polyolefin which is a thermoplastic resin include homopolymers and copolymers which are each obtained by polymerizing a monomer(s) such as ethylene, propylene, 1-butene, 4-methyl-1-pentene, 1-hexene, and/or the like. Specifically, examples of such homopolymers include polyethylene, polypropylene, and polybutene. Meanwhile, examples of such copolymers include an ethylene-propylene copolymer.

Among the above polyolefins, polyethylene is more preferable because it is possible to prevent (shut down) a flow of an excessively large electric current at a lower temperature. Examples of the polyethylene include low-density polyethylene, high-density polyethylene, linear polyethylene (ethylene-α-olefin copolymer), and ultra-high molecular weight polyethylene having a weight-average molecular weight of not less than 1,000,000. Among these polyethylenes, ultra-high molecular weight polyethylene having a weight-average molecular weight of not less than 1,000,000 is still more preferable.

The porous film has a thickness of preferably 4 μm to 40 μm, more preferably 5 μm to 30 μm, and still more preferably 6 μm to 15 μm.

The porous film has a weight per unit area which weight should be set as appropriate in view of strength, a thickness, a weight, and handleability of the porous film. Note, however, that the weight per unit area of the porous film is preferably 4 g/m² to 20 g/m², more preferably 4 g/m² to 12 g/m², and still more preferably 5 g/m² to 10 g/m², so as to allow the nonaqueous electrolyte secondary battery to have a higher weight energy density and a higher volume energy density.

The porous film has an air permeability of preferably 30 sec/100 mL to 500 sec/100 mL, and more preferably 50 sec/100 mL to 300 sec/100 mL, in terms of Gurley values. A porous film having the above air permeability can achieve sufficient ion permeability.

The porous film has a porosity of preferably 20% by volume to 80% by volume, and more preferably 30% by volume to 75% by volume, so as to (i) retain an electrolyte in a larger amount and (ii) obtain a function of reliably preventing (shutting down) a flow of an excessively large electric current at a lower temperature. Further, in order to achieve sufficient ion permeability and prevent particles from entering the positive electrode and/or the negative electrode, the porous film has pores each having a pore size of preferably not more than 0.3 μm, and more preferably not more than 0.14 μm.

The porous film preferably has a puncture strength of not less than 3 N, from the viewpoint of (i) preventing the porous film from being punctured by positive/negative electrode active material particles having fallen off from a positive electrode and/or a negative electrode or an electrically conductive foreign substance which may enter into a battery and (ii) ultimately preventing a short circuit from occurring between the positive electrode and the negative electrode. Meanwhile, the puncture strength of the porous film is preferably not more than 10 N, and more preferably not more than 8 N.

The polyolefin porous film for an embodiment of the present invention has a parameter X of not more than 20, more preferably not more than 19, and still more preferably not more than 18, the parameter X indicating anisotropy of tan δ obtained through dynamic viscoelasticity measurement at a frequency of 10 Hz and at a temperature of 90° C. The parameter X is expressed by the following expression (1):

$$X = 100 \times |\text{MD tan }\delta - \text{TD tan }\delta| / \{(\text{MD tan }\delta + \text{TD tan }\delta)/2\} \quad (1)$$

where MD tan δ is tan δ in a machine direction (MD; flow direction) of the porous film, and TD tan δ is tan δ in a transverse direction (TD; width direction or crosswise direction) of the porous film.

The parameter X indicates anisotropy of tan δ calculated by the following expression (1a):

$$\tan \delta = E''/E' \quad (1a)$$

where E' represents a storage modulus, and E" represents a loss modulus. The storage modulus E' and the loss modulus E" are each measured through the dynamic viscoelasticity measurement. The storage modulus indicates reversible deformability under stress, and the loss modulus indicates non-reversible deformability under stress. As such, tan δ indicates followability of deformation of a porous film with respect to a change in external stress. The porous film which has a smaller amount of in-plane anisotropy of tan δ has more isotropic deformation followability with respect to a change in external stress, so that the porous film can more homogeneously deform in a surface direction thereof.

The polyolefin porous film for an embodiment of the present invention having the parameter X whose value is not more than 20 can have isotropic deformation followability with respect to a change in external stress to the polyolefin porous film. Such external stress is caused by expansion and shrinkage of an electrode plate (electrode active material layer) in a case where charge and discharge cycles are repeated. As a result, less anisotropic stress is generated in the porous film due to the external stress. This presumably (i) makes it possible to prevent, for example, falling-off of an electrode active material during charge and discharge cycles, and (ii) consequently allows the nonaqueous electrolyte secondary battery to have an enhanced battery characteristic.

Note that in a case where a porous layer and/or another layer other than the porous layer is disposed on the porous film, physical property values of such a porous film can be measured by the porous film isolated by removing the porous layer and/or the another layer from a laminated body including the porous film, and the porous layer and/or the another layer. The porous layer and/or the another layer can be removed from the laminated body by, for example, a method in which a resin(s) constituting the porous layer and/or the another layer is/are dissolved with use of a solvent such as N-methylpyrrolidone or acetone for removal.

Examples of a method of producing the polyolefin porous film for an embodiment of the present invention includes a method including the steps of (1) obtaining a polyolefin resin composition by kneading (i) ultra-high molecular weight polyolefin, (ii) a low molecular weight polyolefin having a weight-average molecular weight of not more than 10,000, and (iii) a pore forming agent, (2) forming (rolling) a sheet with use of reduction rollers to roll the polyolefin resin composition obtained in the step (1), (3) removing the pore forming agent from the sheet obtained in the step (2), and (4) obtaining a porous film by stretching the sheet obtained in the step (3). Note that the stretching of the sheet in the step (4) can be carried out before the removal of the pore forming agent from the sheet in the step (3).

In the method of producing a polyolefin porous film, preferable conditions for producing a porous film having a parameter X of not more than 20 are, for example, as follows: (a) in the step (1) above, two-stage preparation (two-stage mixing) is carried out in which raw materials such as the ultra-high molecular weight polyolefin and the low molecular weight polyolefin are mixed first with use of, for example, a Henschel mixer (first stage mixing is carried out), and then mixing is carried out again by adding the pore forming agent to a resultant mixture obtained by the first stage mixing (second stage mixing is carried out); and (b) in the step (4) above, the porous film after stretching is subjected to an annealing (heat fixation) treatment at a temperature of preferably not lower than (Tm−30° C.), more preferably not lower than (Tm−20° C.), and still more preferably not lower than (Tm−10° C.), where Tm is a melting point of the polyolefin (ultra-high molecular weight polyolefin) contained in the porous film after the stretching. When the polyolefin porous film is produced by using the above-described preferable production conditions, a crystalline and amorphous distribution in a resultant porous film can be controlled so as to be more uniform. This makes it possible to control the parameter X so that the value of the parameter X will be not more than 20.

(Porous Layer)

The porous layer is provided, as a constituent member of the nonaqueous electrolyte secondary battery, between the nonaqueous electrolyte secondary battery separator and at least one of the positive electrode plate and the negative electrode plate. The porous layer can be provided on one surface or each of both surfaces of the nonaqueous electrolyte secondary battery separator. Alternatively, the porous layer can be provided on an active material layer of at least one of the positive electrode plate and the negative electrode plate. Alternatively, the porous layer can be provided between the nonaqueous electrolyte secondary battery separator and at least one of the positive electrode plate and the negative electrode plate so as to be in contact with the nonaqueous electrolyte secondary battery separator and the positive electrode plate or the negative electrode plate. The porous layer may be provided so as to form one layer or two or more layers, between the nonaqueous electrolyte secondary battery separator and at least one of the positive electrode plate and the negative electrode plate.

The porous layer is preferably an insulating porous layer containing a resin.

The resin which can be contained in the insulating porous layer is preferably a resin that is insoluble in the electrolyte of the battery and that is electrochemically stable when the battery is in normal use. In a case where the porous layer is disposed on one surface of the porous film, the porous layer is disposed preferably on a surface of the porous film which surface faces the positive electrode plate of the nonaqueous electrolyte secondary battery, and more preferably on a surface of the porous film which surface is in contact with the positive electrode plate.

The porous layer for an embodiment of the present invention contains a PVDF-based resin, which contains a PVDF-based resin having crystal form $\alpha$ (hereinafter, referred to as "$\alpha$-form PVDF-based resin") in a content of not less than 35.0 mol % with respect to 100 mol % of the total content of the $\alpha$-form PVDF-based resin and a PVDF-based resin having crystal form $\beta$ (hereinafter, referred to as "$\beta$-form PVDF-based resin") in the PVDF-based resin.

The content of the $\alpha$-form PVDF-based resin is calculated by (a) waveform separation of $(\alpha/2)$ observed at around −78 ppm in a $^{19}$F-NMR spectrum obtained from the porous layer and (b) waveform separation of $\{(\alpha/2)+\beta\}$ observed at around −95 ppm in the $^{19}$F-NMR spectrum obtained from the porous layer.

The porous layer has a structure in which many pores connected to one another are provided. Accordingly, the porous layer is a layer through which a gas or a liquid can pass from one surface to the other. Further, in a case where the porous layer for an embodiment of the present invention is used as a constituent member of a nonaqueous electrolyte secondary battery laminated separator, the porous layer can be a layer which, serving as an outermost layer of the laminated separator, comes in contact with an electrode.

Examples of the PVDF-based resin include homopolymers of vinylidene fluoride; copolymers of vinylidene fluoride and other monomer(s) polymerizable with vinylidene fluoride; and mixtures of the above polymers. Examples of the monomer polymerizable with vinylidene fluoride include hexafluoropropylene, tetrafluoroethylene, trifluoroethylene, trichloroethylene, and vinyl fluoride. It is possible to use one kind of monomer or two or more kinds of monomers selected from above monomers. The PVDF-based resin can be synthesized through emulsion polymerization or suspension polymerization.

The PVDF-based resin contains, as a constituent unit, vinylidene fluoride in a proportion of normally not less than 85 mol %, preferably not less than 90 mol %, more preferably not less than 95 mol %, and further preferably not less than 98 mol %. A PVDF-based resin containing vinylidene fluoride in a proportion of not less than 85 mol % is more likely to allow a porous layer to have a mechanical strength against pressure and a heat resistance against heat during battery production.

The porous layer can also preferably contain two kinds of PVDF-based resins (that is, a first resin and a second resin below) that differ from each other in terms of, for example, the hexafluoropropylene content.

The first resin is (i) a vinylidene fluoride-hexafluoropropylene copolymer containing hexafluoropropylene in a proportion of more than 0 mol % and not more than 1.5 mol % or (ii) a vinylidene fluoride homopolymer.

The second resin is a vinylidene fluoride-hexafluoropropylene copolymer containing hexafluoropropylene in a proportion of more than 1.5 mol %.

A porous layer containing the two kinds of PVDF-based resins adheres better to an electrode than a porous layer not containing one of the two kinds of PVDF-based resins.

Further, a porous layer containing the two kinds of PVDF-based resins adheres better to another layer (for example, a layer of the porous film) included in a nonaqueous electrolyte secondary battery separator than a porous layer not containing one of the two kinds of PVDF-based resins. This allows the porous layer containing the two kinds of PVDF-based resin to have a higher peel strength between the porous layer and the another layer, as compared to a porous layer not containing one of the two kinds of PVDF-based resins. The first resin and the second resin are preferably at a mass ratio (first resin:second resin) of 15:85 to 85:15.

The weight-average molecular weight of the PVDF-based resin is preferably 200,000 to 3,000,000, more preferably 200,000 to 2,000,000, still more preferably 500,000 to 1,500,000. A PVDF-based resin having a weight-average molecular weight of not less than 200,000 tends to allow the porous layer and the electrode to sufficiently adhere to each other. On the other hand, a PVDF-based resin having a weight-average molecular weight of not more than 3,000,000 tends to have excellent shaping easiness.

The porous layer may contain, as a resin other than the PVDF-based resin, for example, any of styrene-butadiene copolymers; homopolymers or copolymers of vinyl nitriles such as acrylonitrile and methacrylonitrile; and polyethers such as polyethylene oxide and polypropylene oxide.

The porous layer for an embodiment of the present invention may contain a filler such as an inorganic filler (e.g., metal oxide fine particles etc.) or an organic filler. The filler is contained in a proportion of preferably not less than 1% by mass and not more than 99% by mass, and more preferably not less than 10% by mass and not more than 98% by mass, with respect to the total amount of the PVDF-based resin and the filler. A lower limit of the proportion of the filler may be not less than 50% by mass, not less than 70% by mass, or not less than 90% by mass. The filler such as an organic filler or an inorganic filler can be a conventionally known filler.

The porous layer has an average thickness of preferably 0.5 µm to 10 µm per layer, and more preferably 1 µm to 5 µm per layer in order to ensure adhesion of the porous layer to an electrode and a high energy density.

In a case where the porous layer has a thickness of not less than 0.5 µm per layer, it is possible to sufficiently prevent an internal short circuit caused by, for example, breakage of the nonaqueous electrolyte secondary battery, and also to retain a sufficient amount of the electrolyte in the porous layer.

On the other hand, in a case where the porous layer has a thickness of more than 10 µm per layer, the nonaqueous electrolyte secondary battery has an increased resistance to permeation of lithium ions in an entire region of the nonaqueous electrolyte secondary battery laminated separator. Thus, repeating charge and discharge cycles will degrade the positive electrode of the nonaqueous electrolyte secondary battery. This leads to a decreased rate characteristic and a decreased cycle characteristic. Further, such a porous layer has an increased distance between the positive electrode and the negative electrode. This leads to a decreased internal volume efficiency of the nonaqueous electrolyte secondary battery.

The porous layer for an embodiment of the present invention is preferably provided between the nonaqueous electrolyte secondary battery separator and the positive electrode active material layer which is included in the positive electrode plate. In the following description of physical properties of the porous layer, the physical properties of the porous layer means at least physical properties of a porous layer which is disposed between the nonaqueous electrolyte secondary battery separator and the positive electrode active material layer which is included in the positive electrode plate in a resultant nonaqueous electrolyte secondary battery.

The porous layer has a weight per unit area (per layer) which weight should be set as appropriate in view of strength, a thickness, a weight, and handleability of the porous layer. The weight per unit area of the porous layer is preferably 0.5 g/m$^2$ to 20 g/m$^2$ per layer and more preferably 0.5 g/m$^2$ to 10 g/m$^2$ per layer.

A porous layer having a weight per unit area (per layer) within the above numerical range allows a nonaqueous electrolyte secondary battery including the porous layer to have a higher weight energy density and a higher volume energy density. In a case where the weight per unit area of the porous layer is beyond the above range, a nonaqueous electrolyte secondary battery including the porous layer will be heavy.

The porous layer has a porosity of preferably 20% by volume to 90% by volume, and more preferably 30% by volume to 80% by volume, in order to achieve sufficient ion permeability. The pores in the porous layer have a diameter of preferably not more than 1.0 µm, and more preferably not more than 0.5 µm. In a case where the pores each have such a diameter, a nonaqueous electrolyte secondary battery that includes the porous layer can achieve sufficient ion permeability.

A nonaqueous electrolyte secondary battery laminated separator including the porous layer has an air permeability of preferably 30 sec/100 mL to 1000 sec/100 mL, and more preferably 50 sec/100 mL to 800 sec/100 mL, in terms of Gurley values. The nonaqueous electrolyte secondary battery laminated separator having such an air permeability can achieve sufficient ion permeability in a nonaqueous electrolyte secondary battery.

In a case where the air permeability is lower than the above range, the nonaqueous electrolyte secondary battery laminated separator has a high porosity and thus has a coarse laminated structure. This may result in a decreased strength of the nonaqueous electrolyte secondary battery laminated separator, and thus lead to insufficient shape stability particularly at high temperatures. On the other hand, in a case where the air permeability is higher than the above range, the nonaqueous electrolyte secondary battery laminated separator may not be able to achieve sufficient ion permeability. This may degrade the battery characteristics of the nonaqueous electrolyte secondary battery.

(Crystal Forms of PVDF-Based Resin)

The PVDF-based resin contained in the porous layer for an embodiment of the present invention contains an α-form PVDF-based resin in a content of not less than 35.0 mol %, preferably not less than 37.0 mol %, more preferably not less than 40.0 mol %, and still more preferably not less than 44.0 mol % with respect to 100 mol % of the total content of the α-form PVDF-based resin and the β-form PVDF-based resin in the PVDF-based resin. Further, the α-form PVDF-based resin is contained preferably in a content of not more than 90.0 mol %. The porous layer containing the α-form PVDF-based resin in a content within the above range is suitably used as a constituent member of a nonaqueous electrolyte secondary battery which excellently maintains a charge capacity after high-rate discharge.

The nonaqueous electrolyte secondary battery generates heat due to internal resistance of the battery when the battery is charged or discharged. A larger current, that is, a higher rate condition leads to generation of a larger amount of heat. With regard to the melting point of the PVDF-based resin, the melting point of the α-form PVDF-based resin is higher than that of the β-form PVDF-based resin. Accordingly, plastic deformation due to heat less occurs in the α-form PVDF-based resin than in the β-form PVDF-based resin. Further, it is known that since the β-form PVDF-based resin has a structure in which fluorine atoms are aligned on one side, the β-form PVDF-based resin has a higher polarizability than the α-form PVDF-based resin.

In the porous layer for an embodiment of the present invention, a proportion of the α-form PVDF-based resin of the PVDF-based resin constituting the porous layer is arranged to be not lower than a certain level. This makes it possible to decrease, in charge and discharge, deformation of an internal structure of the porous layer, blockage of pores, and/or the like each caused by deformation of the PVDF-based resin due to heat generation particularly during an operation under a high rate condition. Further, it is possible to prevent Li ions from being unevenly distributed due to interaction between the Li ions and the PVDF-based resin. This consequently makes it possible to prevent deterioration of battery performance.

The α-form PVDF-based resin is characterized by being made of a polymer containing a PVDF skeleton having the following conformation:

$$TGT\overline{G}\text{-TYPE CONFORMATION} \quad \text{[Math. 1]}$$

The conformation includes two or more constituent conformations chained consecutively, each of which constituent conformations is arranged such that, with respect to a fluorine atom (or a hydrogen atom) bonded to one carbon atom of a main chain in a molecular chain of the PVDF skeleton, (i) a hydrogen atom (or a fluorine atom) bonded to a neighboring carbon atom in the main chain is in a trans position, which neighboring carbon atom is adjacent to the one carbon atom on one side of the one carbon atom, and (ii) a hydrogen atom (or a fluorine atom) bonded to another neighboring carbon atom in the main chain is in a gauche position (positioned at an angle of 60°), which another neighboring carbon atom is adjacent to the one carbon atom on the other (opposite) side of the one carbon atom. Further, the molecular chain is of the following type:

$$TGT\overline{G} \quad \text{[Math. 2]}$$

wherein the respective dipole moments of C—$F_2$ and C—$H_2$ bonds each have a component perpendicular to the molecular chain and a component parallel to the molecular chain.

In a $^{19}$F-NMR spectrum of the α-form PVDF-based resin, characteristic peaks appear at around −95 ppm and at around −78 ppm.

The β-form PVDF-based resin is characterized by being made of a polymer containing a PVDF skeleton, in which (i) a fluorine atom and a hydrogen atom are bonded respectively to carbon atoms adjacent to each other in a main chain of a molecular chain of the PVDF skeleton, and (ii) the fluorine atom and the hydrogen atom are arranged in a trans conformation (TT-type conformation). In other words, the β-form PVDF-based resin is characterized by being made of a polymer containing a PVDF skeleton in which a fluorine atom and a hydrogen atom, bonded respectively to adjacent carbon atoms forming a carbon-carbon bond in a main chain, are positioned oppositely at an angle of 180 degrees when viewed in a direction of that carbon-carbon bond.

The β-form PVDF-based resin may be arranged such that the PVDF skeleton has a TT-type conformation in its entirety. Alternatively, the β-form PVDF-based resin may be arranged such that a portion of the PVDF skeleton has the TT-type conformation and that the PVDF skeleton has a molecular chain of the TT-type conformation in at least four consecutive PVDF monomer units. In either case, in the TT-type conformation, (i) the carbon-carbon bond, which constitutes a TT backbone, has a planar zigzag structure, and (ii) the respective dipole moments of C—$F_2$ and C—$H_2$ bonds each have a component perpendicular to the molecular chain.

In a $^{19}$F-NMR spectrum of the β-form PVDF-based resin, a characteristic peak appears at around −95 ppm.

(Method of Calculating Content Ratios of α-Form PVDF-Based Resin and β-Form PVDF-Based Resin in PVDF-Based Resin)

A content ratio of the α-form PVDF-based resin and a content ratio of the β-form PVDF-based resin are ratios with respect to 100 mol % of the total content of the α-form PVDF-based resin and the β-form PVDF-based resin in the porous layer for the an embodiment of present invention. The content ratio of the α-form PVDF-based resin and the content ratio of the β-form PVDF-based resin can be calculated from a $^{19}$F-NMR spectrum obtained from the porous layer. Specifically, the content ratio of the α-form PVDF-based resin and the content ratio of the β-form PVDF-based resin can be calculated, for example, as follows.

(1) An $^{19}$F-NMR spectrum is obtained from a porous layer containing a PVDF-based resin, under the following conditions.

Measurement Conditions
Measurement device: AVANCE400 manufactured by Bruker Biospin
Measurement method: single-pulse method
Observed nucleus: $^{19}$F
Spectral bandwidth: 100 kHz
Pulse width: 3.0 s (90° pulse)
Pulse repetition time: 5.0 s
Reference material: $C_6F_6$ (external reference: −163.0 ppm)
Temperature: 22° C.
Sample rotation frequency: 25 kHz (2) An integral value of a peak at around −78 ppm in the $^{19}$F-NMR spectrum obtained in (1) is calculated and is referred to as the amount α/2.

(3) As with the case of (2), an integral value of a peak at around −95 ppm in the $^{19}$F-NMR spectrum obtained in (1) is calculated and is referred to as the amount {(α/2)+β}.

(4) A content ratio (hereinafter, also referred to as "α ratio") of the α-form PVDF-based resin with respect to 100 mol % of a total content of the α-form PVDF-based resin and a β-form PVDF-based resin is calculated, from the integral values obtained in (2) and (3), in accordance with the following Expression (ii).

α ratio (mol %)=[(integral value at around −78 ppm)×2/{(integral value at around −95 ppm)+(integral value at around −78 ppm)}]×100   (ii)

(5) A content ratio (hereinafter, also referred to as "β ratio") of the β-form PVDF-based resin with respect to 100 mol % of the total content of the α-form PVDF-based resin and the β-form the PVDF-based resin is calculated, on the basis of the α ratio obtained in (4), in accordance with the following Expression (iii).

β ratio (mol %)=100 (mol %)−α ratio (mol %)   (iii)

(Method of Producing Porous Layer and Nonaqueous Electrolyte Secondary Battery Laminated Separator)

With regard to a method of producing the porous layer and the nonaqueous electrolyte secondary battery laminated separator for an embodiment of the present invention, the method is not limited to a particular one, and can be any of various methods.

In an example method, a porous layer containing a PVDF-based resin and optionally a filler is formed, through one of the processes (1) to (3) below, on a surface of a porous film as a base material. In the case of the process (2) or (3), a porous layer can be produced by drying a deposited porous layer for removal of a solvent. In the processes (1) to (3), a coating solution, in the case of production of a porous layer containing a filler, preferably contains the filler dispersed therein and the PVDF-based resin dissolved therein.

The coating solution for use in a method of producing a porous layer for an embodiment of the present invention can be prepared normally by (i) dissolving, in a solvent, a resin to be contained in the porous layer and (ii) dispersing, in the solvent, the filler to be contained in the porous layer.

(1) A process of forming a porous layer by (i) coating a surface of a porous film with a coating solution containing a PVDF-based resin to be contained in the porous layer and optionally a filler and (ii) drying the surface of the porous film so as to remove a solvent (dispersion medium) from the coating solution.

(2) A process of forming a porous layer by deposition, by (i) coating a surface of a porous film with the coating solution described above in the process (1) and then (ii) immersing the porous film in a deposition solvent, which is a poor solvent for the above PVDF-based resin.

(3) A process of forming a porous layer by deposition, by (i) coating a surface of a porous film with the coating solution described above in the process (1) and then (ii) acidifying the coating solution with use of a low-boiling-point organic acid.

Examples of a solvent (dispersion medium) in the above coating solution include N-methylpyrrolidone, N,N-dimethylacetamide, N,N-dimethylformamide, acetone, and water.

The deposition solvent is preferably isopropyl alcohol or t-butyl alcohol, for example.

For the process (3), the low-boiling-point organic acid can be, for example, paratoluene sulfonic acid or acetic acid.

Note that the base material can be, other than the porous film, a film of another kind, a positive electrode plate, a negative electrode plate, or the like.

The coating solution can contain, as a component other than the above-described resin and the filler, an appropriate amount of an additive(s) such as a disperser, a plasticizer, a surfactant, and a pH adjustor.

The coating solution can be applied to the base material by a conventionally known method. Specific examples of such a method include a gravure coater method, a dip coater method, a bar coater method, and a die coater method.

(Method of Controlling Crystal Forms of PVDF-Based Resin)

A crystal form of the PVDF-based resin contained in the porous layer for an embodiment of the present invention can be controlled by adjusting, in the above-described method, (i) drying conditions such as a drying temperature, and an air velocity and an air direction in drying, and/or (ii) a deposition temperature in a case where a porous layer containing a PVDF-based resin is deposited with use of a deposition solvent or a low-boiling-point organic acid.

Note that in order to attain the PVDF-based resin arranged such that the content of the α-form PVDF-based resin is not less than 35.0 mol % with respect to 100 mol % of the total content of the α-form PVDF-based resin and the β-form PVDF-based resin in the PVDF-based resin, the drying conditions and the deposition temperature can be changed as appropriate in accordance with a method of producing a porous layer, a solvent (dispersion medium) as used, types of a deposition solvent and a low-boiling-point organic acid, and the like.

In a case where the coating solution is simply dried as in the process (1), the drying conditions can be changed as appropriate in accordance with, for example, the amount of the solvent in the coating solution, the concentration of the PVDF-based resin in the coating solution, the amount of the filler (if contained), and/or the amount of the coating solution to be applied. In a case where a porous layer is to be formed through the process (1) described above, it is preferable that the drying temperature be 30° C. to 100° C., that the direction of hot air for drying be perpendicular to a porous film or electrode sheet to which the coating solution has been applied, and that the velocity of the hot air be 0.1 m/s to 40 m/s. Specifically, in a case where a coating solution to be applied contains N-methyl-2-pyrrolidone as the solvent for dissolving a PVDF-based resin, 1.0% by mass of the PVDF-based resin, and 9.0% by mass of alumina as an inorganic filler, the drying conditions are preferably adjusted so that the drying temperature is 40° C. to 100° C., that the direction of hot air for drying is perpendicular to a porous film or electrode sheet to which the coating solution has been applied, and that the velocity of the hot air is 0.4 m/s to 40 m/s.

In a case where a porous layer is to be formed through the process (2) described above, it is preferable that the deposition temperature be −25° C. to 60° C. and that the drying temperature be 20° C. to 100° C. Specifically, in a case where a porous layer is to be formed through the above-described process (2) with use of (i) N-methylpyrrolidone as the solvent for dissolving a PVDF-based resin and (ii) isopropyl alcohol as the deposition solvent, it is preferable that the deposition temperature be −10° C. to 40° C. and that the drying temperature be 30° C. to 80° C.

(Another Porous Layer)

The nonaqueous electrolyte secondary battery in accordance with an embodiment of the present invention may contain another porous layer in addition to (i) the porous film and (ii) the porous layer which contains the PVDF-based resin. The another porous layer need only be provided between (i) the nonaqueous electrolyte secondary battery separator and (ii) at least one of the positive electrode plate and the negative electrode plate. The porous layer and the another porous layer may be provided in any order with respect to the nonaqueous electrolyte secondary battery separator. In a preferable configuration, the porous film, the another porous layer, and the porous layer which contains the PVDF-based resin are disposed in this order. In other words, the another porous layer is provided between the porous film and the porous layer which contains the PVDF-based resin. In another preferable configuration, the another porous layer and the porous layer which contains the PVDF-based resin are provided in this order on both surfaces of the porous film.

Further, the another porous layer for an embodiment of the present invention may contain, for example, any of polyolefins; (meth)acrylate-based resins; fluorine-containing resins (excluding polyvinylidene fluoride-based resins); polyamide-based resins; polyimide-based resins; polyester-based resins; rubbers; resins each having a melting point or a glass transition temperature of not lower than 180° C.; water-soluble polymers; and polycarbonate, polyacetal, and polyether ether ketone.

Among the above resins, polyolefins, (meth)acrylate-based resins, polyamide-based resins, polyester-based resins and water-soluble polymers are preferable.

Preferable examples of the polyolefins include polyethylene, polypropylene, polybutene, and an ethylene-propylene copolymer.

Examples of the fluorine-containing resins include polytetrafluoroethylene, a vinylidene fluoride-hexafluoropropylene copolymer, a tetrafluoroethylene-hexafluoropropylene copolymer, a tetrafluoroethylene-perfluoroalkyl vinyl ether copolymer, a vinylidene fluoride-tetrafluoroethylene copolymer, a vinylidene fluoride-trifluoroethylene copolymer, a vinylidene fluoride-trichloroethylene copolymer, a vinylidene fluoride-vinyl fluoride copolymer, a vinylidene fluoride-hexafluoropropylene-tetrafluoroethylene copolymer, and an ethylene-tetrafluoroethylene copolymer, and particularly fluorine-containing rubbers having a glass transition temperature of not higher than 23° C.

Preferable examples of the polyamide-based resins include aramid resins such as aromatic polyamides and wholly aromatic polyamides.

Specific examples of the aramid resins include poly(paraphenylene terephthalamide), poly(metaphenylene isophthalamide), poly(parabenzamide), poly(metabenzamide), poly(4,4'-benzanilide terephthalamide), poly(paraphenylene-4,4'-biphenylene dicarboxylic acid amide), poly(metaphenylene-4,4'-biphenylene dicarboxylic acid amide), poly(paraphenylene-2,6-naphthalene dicarboxylic acid amide), poly(metaphenylene-2,6-naphthalene dicarboxylic acid amide), poly(2-chloroparaphenylene terephthalamide), a paraphenylene terephthalamide/2,6-dichloroparaphenylene terephthalamide copolymer, and a metaphenylene terephthalamide/2,6-dichloroparaphenylene terephthalamide copolymer. Among those aramid resins, poly(paraphenylene terephthalamide) is more preferable.

The polyester-based resins are preferably aromatic polyesters such as polyarylates, and liquid crystal polyesters.

Examples of the rubbers include a styrene-butadiene copolymer and a hydride thereof, a methacrylate ester copolymer, an acrylonitrile-acrylic ester copolymer, a styrene-acrylic ester copolymer, ethylene propylene rubber, and polyvinyl acetate.

Examples of the resins each having a melting point or a glass transition temperature of not lower than 180° C. include polyphenylene ether, polysulfone, polyether sulfone, polyphenylene sulfide, polyetherimide, polyamide imide, and polyether amide.

Examples of the water-soluble polymers include polyvinyl alcohol, polyethylene glycol, cellulose ether, sodium alginate, polyacrylic acid, polyacrylamide, and polymethacrylic acid.

The another porous layer may contain only one kind of the above resins or two or more kinds of the above resins in combination.

Other features (e.g., thickness) of the another porous layer are similar to those of the porous layer described in the above (Porous layer), except that the porous layer contains the PVDF-based resin.

<Positive Electrode Plate>

The positive electrode plate in the nonaqueous electrolyte secondary battery in accordance with an embodiment of the present invention is not limited to any particular one, provided that the positive electrode plate has a capacitance falling within the above-described range per measurement area of 900 mm$^2$. For example, a sheet-shaped positive electrode plate used in the nonaqueous electrolyte secondary battery includes (i) a positive electrode mix as a positive electrode active material layer, which positive electrode mix contains a positive electrode active material, an electrically conductive agent, and a binding agent and (ii) a positive electrode current collector supporting the positive electrode mix thereon. Note that the positive electrode plate can be arranged such that the positive electrode current collector supports the positive electrode mix on one surface or each of both surfaces of the positive electrode current collector.

The positive electrode active material is, for example, a material capable of being doped with and dedoped of lithium ions. Such a material is preferably a transition metal oxide. Specific examples of the transition metal oxide include a lithium complex oxide containing at least one transition metal such as V, Mn, Fe, Co, or Ni.

Examples of the electrically conductive agent include carbonaceous materials such as natural graphite, artificial graphite, cokes, carbon black, pyrolytic carbons, carbon fiber, and a fired product of an organic polymer compound. It is possible to use only one kind of the above electrically conductive agents or two or more kinds of the above electrically conductive agents in combination.

Examples of the binding agent include: thermoplastic resins such as polyvinylidene fluoride, a copolymer of vinylidene fluoride, polytetrafluoroethylene, a tetrafluoroethylene-hexafluoropropylene copolymer, a tetrafluoroethylene-perfluoroalkyl vinyl ether copolymer, an ethylene-tetrafluoroethylene copolymer, a vinylidene fluoride-hexafluoropropylene copolymer, a vinylidene fluoride-hexafluoropropylene-tetrafluoroethylene copolymer, a thermoplastic polyimide, polyethylene, and polypropylene; an acrylic resin; and styrene-butadiene rubber. Note that the binding agent functions also as a thickener.

Examples of the positive electrode current collector include electric conductors such as Al, Ni, and stainless steel. Among these electric conductors, Al is more preferable because Al is easily processed into a thin film and is inexpensive.

Examples of a method of producing the sheet-shaped positive electrode plate include: a method in which a positive electrode active material, an electrically conductive agent, and a binding agent are pressure-molded on a positive electrode current collector; and a method in which (i) a positive electrode active material, an electrically conductive agent, and a binding agent are formed into a paste with use of a suitable organic solvent, (ii) then, a positive electrode current collector is coated with the paste, and (iii) subsequently, the paste dried is pressured so that the paste is firmly fixed to the positive electrode current collector.

<Negative Electrode Plate>

The negative electrode plate in the nonaqueous electrolyte secondary battery in accordance with an embodiment of the present invention is not limited to any particular one, provided that the negative electrode plate has a capacitance falling within the above-described range per measurement area of 900 mm$^2$. For example, a sheet-shaped negative electrode plate used in the nonaqueous electrolyte secondary battery includes (i) a negative electrode mix as a negative electrode active material layer, which negative electrode mix contains a negative electrode active material and (ii) a negative electrode current collector supporting the negative electrode mix thereon. The sheet-shaped negative electrode plate preferably contains an electrically conductive agent as described above and a binding agent as described above. Note that the negative electrode plate can be arranged such that the negative electrode current collector supports the negative electrode mix on one surface or each of both surfaces of the negative electrode current collector.

Examples of the negative electrode active material include (i) a material capable of being doped with and dedoped of lithium ions, (ii) lithium metal, and (iii) lithium alloy. Examples of such a material include carbonaceous materials. Examples of the carbonaceous materials include graphite (natural graphite, artificial graphite), cokes, carbon black, and pyrolytic carbons. The electrically conductive agent can be any of the above-described electrically conductive agents which may be contained in the positive electrode active material layer. Meanwhile, the binding agent can be any of the above-described binding agents which may be contained in the positive electrode active material layer.

Examples of the negative electrode current collector include Cu, Ni, and stainless steel. Among these electric conductors, Cu is more preferable because Cu is not easily alloyed with lithium particularly in a lithium-ion secondary battery and is easily processed into a thin film.

Examples of a method of producing the sheet-shaped negative electrode plate include: a method in which a negative electrode active material is pressure-molded on a negative electrode current collector; and a method in which (i) a negative electrode active material is formed into a paste with use of a suitable organic solvent, (ii) then, a negative electrode current collector is coated with the paste, and (iii) subsequently, the paste dried is pressured so that the paste is firmly fixed to the negative electrode current collector. The paste preferably contains an electrically conductive agent as described above and a binding agent as described above.

<Nonaqueous Electrolyte>

A nonaqueous electrolyte, which may be contained in a nonaqueous electrolyte secondary battery in accordance with an embodiment of the present invention, is not limited to any particular one, provided that the nonaqueous electrolyte is one that is generally used for a nonaqueous electrolyte secondary battery. The nonaqueous electrolyte can be, for example, a nonaqueous electrolyte containing, for example, an organic solvent and a lithium salt dissolved therein. Examples of the lithium salt include $LiClO_4$, $LiPF_6$, $LiAsF_6$, $LiSbF_6$, $LiBF_4$, $LiCF_3SO_3$, $LiN(CF_3SO_2)_2$, $LiC(CF_3SO_2)_3$, $Li_2B_{10}Cl_{10}$, lower aliphatic carboxylic acid lithium salt, and $LiAlCl_4$. It is possible to use only one kind of the above lithium salts or two or more kinds of the above lithium salts in combination.

Examples of the organic solvent to be contained in the nonaqueous electrolyte include carbonates, ethers, esters, nitriles, amides, carbamates, and sulfur-containing compounds, and fluorine-containing organic solvents each obtained by introducing a fluorine group into any of these organic solvents. It is possible to use only one kind of the above organic solvents or two or more kinds of the above organic solvents in combination.

<Method of Producing Nonaqueous Electrolyte Secondary Battery>

The nonaqueous electrolyte secondary battery in accordance with an embodiment of the present invention can be produced by, for example, (i) forming a nonaqueous electrolyte secondary battery member by disposing the positive electrode plate, the porous layer, the nonaqueous electrolyte secondary battery separator, and the negative electrode plate in this order, (ii) placing the nonaqueous electrolyte secondary battery member in a container which is to serve as a housing of the nonaqueous electrolyte secondary battery, (iii) filling the container with the nonaqueous electrolyte, and then (iv) hermetically sealing the container while reducing pressure inside the container.

The nonaqueous electrolyte secondary battery in accordance with an embodiment of the present invention includes a nonaqueous electrolyte secondary battery separator including a polyolefin porous film, a porous layer, a positive electrode plate, and a negative electrode plate, as described above. The nonaqueous electrolyte secondary battery in accordance with an embodiment of the present invention satisfies in particular the following requirements (i) to (iv).

(i) The polyvinylidene fluoride-based resin contained in the porous layer is arranged such that the content of the $\alpha$-form polyvinylidene fluoride-based resin is not less than 35.0 mol % with respect to 100 mol % of the total content of the $\alpha$-form polyvinylidene fluoride-based resin and the $\beta$-form polyvinylidene fluoride-based resin in the polyvinylidene fluoride-based resin.

(ii) The positive electrode plate has a capacitance of not less than 1 nF and not more than 1000 nF per measurement area of 900 mm$^2$.

(iii) The negative electrode plate has a capacitance of not less than 4 nF and not more than 8500 nF per measurement area of 900 mm$^2$.

(iv) The parameter X is not more than 20, the parameter X being calculated, in accordance with a specific expression, from tan $\delta$ obtained through a dynamic viscoelasticity measurement at a frequency of 10 Hz and at a temperature of 90° C.

Satisfying the requirement (i) leads to a resultant nonaqueous electrolyte secondary battery in accordance with an embodiment of the present invention having a favorable structural stability of the porous layer after charge and discharge under a high rate condition. Further, satisfying the requirement (iv) allows the polyolefin porous film to follow periodic deformation of electrodes due to charge and discharge. This consequently makes falling-off of electrode active materials unlikely to occur. Further, satisfying the requirements (ii) and (iii) leads to appropriate polarization states of both of the positive electrode active material layer of the positive electrode plate and of the negative electrode active material layer of the negative electrode plate. Therefore, cations are promoted to be solvated to an electrolyte solvent in the negative electrode plate and at a surface of the negative electrode plate, and are promoted to be desolvated from the electrolyte solvent in the positive electrode plate and at a surface of the positive electrode plate. This results in an enhanced permeability of cations.

Accordingly, in a nonaqueous electrolyte secondary battery which satisfies the requirements (i) to (iv), (a) deterioration in performance is prevented, which deterioration may occur due to pore blockage caused by deformation of a polyolefin porous film and a porous layer during an operation of the battery, because the polyolefin porous film and the porous layer after charge and discharge under a high rate condition each have a favorable structural stability and (b) both of the positive electrode active material layer of the positive electrode plate and of the negative electrode active material layer of the negative electrode plate are in appropriate polarization states, respectively. This allows for smooth movement of an electrolyte inside the battery during high-rate discharge and also allows for smooth shift from solvation to desolvation of cations to/from an electrolyte solvent during high-rate discharge. This prevents uneven capacity distribution in a direction of a surface of an electrode plate which uneven capacity distribution may occur due to a high-rate discharge. In other words, uneven concentration of the cations can be eliminated. Accordingly, it is possible to correct uneven capacity distribution in a direction of a surface of an electrode plate. As a result, a nonaqueous electrolyte secondary battery in accordance with an embodiment of the present invention has an enhanced discharge capacity in high-rate discharge (20 C discharge) with respect to a design capacity of the battery.

The present invention is not limited to the embodiments, but can be altered by a skilled person in the art within the scope of the claims. The present invention also encompasses, in its technical scope, any embodiment derived by combining technical means disclosed in differing embodiments.

EXAMPLES

The following description will discuss embodiments of the present invention in greater detail with reference to Examples and Comparative Examples. Note, however, that the present invention is not limited to the following Examples and Comparative Examples.

[Measurement Method]

In Examples and Comparative Examples, measurements were carried out by the following methods.

(1) Untamped Density of Resin Composition

An untamped density of a resin composition used to produce a porous film was measured in conformity with JIS R9301-2-3.

(2) Thickness of Active Material Layer (Unit: μm)

A thickness of a positive electrode active material layer and a thickness of a negative electrode active material layer were measured with use of a high-precision digital measuring device (VL-50) manufactured by Mitutoyo Corporation. Note that the thickness of the positive electrode active material layer was calculated by subtracting a thickness of aluminum foil serving as a current collector from a thickness of the positive electrode plate. Meanwhile, the thickness of the negative electrode active material layer was calculated by subtracting a thickness of copper foil serving as a current collector from a thickness of the negative electrode plate.

(4) Measurement of Porosity of Positive Electrode Active Material Layer

A porosity of a positive electrode active material layer included in a positive electrode plate in Example 1 below was measured by a method below. A porosity of a positive electrode active material layer included in each of the other positive electrode plates in the other Examples below was also measured by a similar method.

A positive electrode plate, arranged such that a layer of a positive electrode mix (a mixture of $LiNi_{0.5}Mn_{0.3}Co_{0.2}O_2$, an electrically conductive agent, and PVDF (at a weight ratio of 92:5:3)) was disposed on one surface of a positive electrode current collector (aluminum foil), was cut to obtain a piece having a size of 14.5 $cm^2$ (4.5 cm×3 cm+1 cm×1 cm). A resultant cut piece of the positive electrode plate had a mass of 0.215 g and had a thickness of 58 μm. The positive electrode current collector was cut to obtain a piece having the same size as the cut piece of the positive electrode plate. A resultant cut piece of the positive electrode current collector had a mass of 0.078 g and had a thickness of 20 μm.

A density ρ of such a positive electrode active material layer was calculated as (0.215−0.078)/{(58−20)/10000× 14.5}=2.5 $g/cm^3$.

Each of materials contained in the layer of the positive electrode mix had a real density as follows: the $LiNi_{0.5}Mn_{0.3}Co_{0.2}O_2$, the electrically conductive agent, and the PVDF had real densities of 4.68 $g/cm^3$, 1.8 $g/cm^3$, and 1.8 $g/cm^3$, respectively.

The positive electrode active material layer had a porosity ε of 40%, which was calculated from the above values by the following expression:

$$\varepsilon=[1-\{2.5\times(92/100)/4.68+2.5\times(5/100)/1.8+2.5\times(3/100)/1.8\}]\times100=40\%$$

(4) Measurement of Porosity of Negative Electrode Active Material Layer

A porosity of a negative electrode active material layer included in a negative electrode plate in Example 1 below was measured by a method below. A porosity of a negative electrode active material layer included in each of the other negative electrode plates in the other Examples below was also measured by a similar method.

A negative electrode plate, arranged such that a layer of a negative electrode mix (a mixture of graphite, a styrene-1,3-butadiene copolymer, and sodium carboxymethyl cellulose (at a weight ratio of 98:1:1)) was disposed on one surface of a negative electrode current collector (copper foil), was cut to obtain a piece having a size of 18.5 $cm^2$ (5 cm×3.5 cm+1 cm×1 cm). A resultant cut piece of the negative electrode plate had a mass of 0.266 g and had a thickness of 48 μm. The negative electrode current collector was cut to obtain a piece having the same size as the cut piece of the negative electrode plate. A resultant cut piece of the negative electrode current collector had a mass of 0.162 g and had a thickness of 10 μm.

A density ρ of such a negative electrode active material layer was calculated as (0.266−0.162)/{(48−10)/10000× 18.5}=1.49 $g/cm^3$.

Each of materials contained in the layer of the negative electrode mix had a real density as follows: the graphite, the styrene-1,3-butadiene copolymer, and the sodium carboxymethyl cellulose had real densities of 2.2 $g/cm^3$, 1 $g/cm^3$, and 1.6 $g/cm^3$, respectively.

The negative electrode active material layer had a porosity ε of 31%, which was calculated from the above values by the following expression:

$$\varepsilon=[1-\{1.49\times(98/100)/2.2+1.49\times(1/100)/1+1.49\times(1/100)/1.6\}]\times100=31\%$$

(5) Dynamic Viscoelasticity

Dynamic viscoelasticity of the porous film was measured at a frequency of 10 Hz and a temperature of 90° C., by use of a dynamic viscoelasticity measurement device (itk DVA-225, manufactured by ITK Co., Ltd.).

Specifically, a test piece was cut out from a porous film so as to be strip-shaped such that an MD of the porous film corresponded to a long side direction of the test piece and so as to have a width of 5 mm. The test piece was used to measure tan δ in the MD while a chuck-to-chuck distance was set at 20 mm and a tension of 30 cN was applied to the test piece. Similarly, another test piece was cut out from the porous film so as to be strip-shaped such that a TD of the porous film corresponded to a long side direction of the another test piece and so as to have a width of 5 mm. The test piece was used to measure tan δ in the TD while a chuck-to-chuck distance was set at 20 mm and a tension of 30 cN was applied to the test piece. The above measurement was carried out at a temperature that was increased from a room temperature at a rate of 20° C./min. The parameter X was calculated, in accordance with the following expression (1), by use of tan δ obtained when the temperature reached 90° C.

$$X=100\times|\text{MD tan }\delta-\text{TD tan }\delta|/\{(\text{MD tan }\delta+\text{TD tan }\delta)/2\} \quad (1)$$

(6) Puncture Strength with Respect to Weight Per Unit Area of Porous Film (Unit: gf/(g/m$^2$))

A porous film was fixed with a washer of 12 mmφ. Then, a maximum stress (gf), which was obtained when the porous film thus fixed was punctured with a pin at 200 mm/min, was measured by use of a handy-type compression tester (KATO TECH CO., LTD.; model No. KES-G5). A value thus obtained was defined as a puncture strength of the porous film. The pin had a diameter of 1 mmφ and a tip having 0.5R.

(7) Measurement of Melting Point of Porous Film

Approximately 50 mg of a nonaqueous electrolyte secondary battery separator was placed in an aluminum pan, and then a DSC thermogram was obtained at a temperature that was increased at a rate of 20° C./min, with use of a differential scanning calorimeter (EXSTAR6000, manufactured by Seiko Instruments Inc.). Then, a peak temperature of a melting peak around 140° C. was regarded as Tm of the porous film.

(8) Method of Calculating α Ratio

A test piece having a size of approximately 2 cm×5 cm was cut out from a laminated separator obtained in Examples and Comparative Examples below. The content ratio (α ratio) of an α-form PVDF-based resin in a PVDF-based resin contained in the test piece of the laminated separator thus cut out was measured according to the steps (1) to (4) of a procedure described in (Method of calculating content ratios of α-form PVDF-based resin and β-form PVDF-based resin in PVDF-based resin) above.

(9) Measurement of Capacitance of Electrode Plate

A capacitance of each of a positive electrode plate and a negative electrode plate per measurement area of 900 mm$^2$, which positive electrode plate and negative electrode plate were obtained in each of Examples and Comparative Examples, was measured with use of an LCR meter (model number: IM3536) manufactured by HIOKI E.E. CORPORATION. Measurement was carried out at a frequency of 300 KHz while measurement conditions were set as follows: CV: 0.010 V, SPEED: SLOW2, AVG: 8, CABLE: 1 m, OPEN: All, SHORT: All DCBIAS 0.00 V. An absolute value of the capacitance thus measured was regarded as a capacitance in Examples and Comparative Examples.

From an electrode plate which was a measurement target, a single piece was cut off so that the single piece had (i) a first portion which had a 3 cm×3 cm square shape and on which an electrode mix was disposed and (ii) a second portion which had a 1 cm×1 cm square shape and on which no electrode mix was disposed. To the second portion of the single piece thus cut off from the electrode plate, a lead wire, having a length of 6 cm and a width of 0.5 cm, was ultrasonically welded to obtain an electrode plate whose capacitance was to be measured (FIG. 1). An aluminum lead wire was used for the positive electrode plate, and a nickel lead wire was used for the negative electrode plate.

Figure 2:
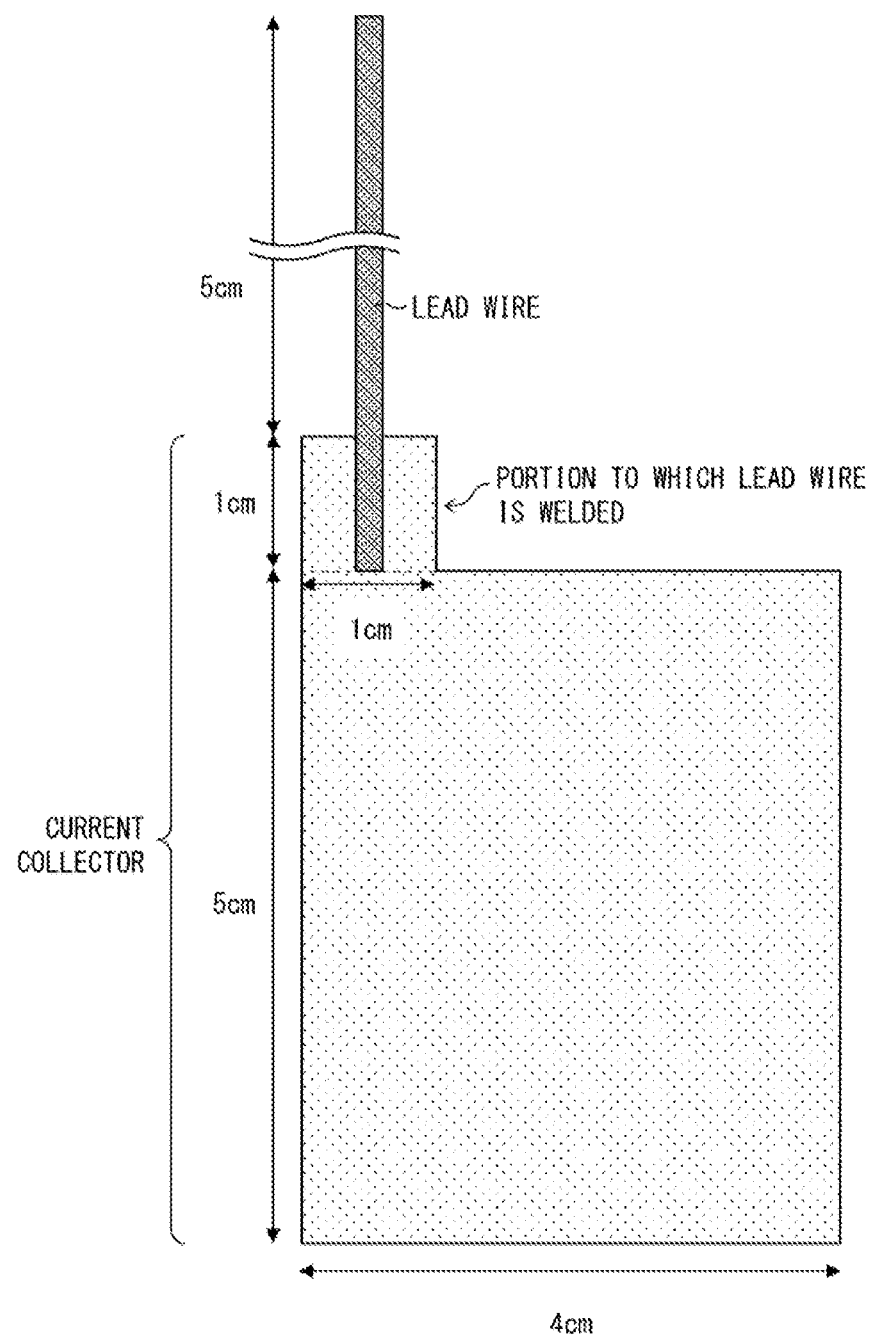
FIG. 2 is a view schematically illustrating a probe electrode which was used for measurement of the capacitance in Examples of the present application.

From a current collector, a single piece was cut off so that the single piece had (i) a first portion which had a 5 cm×4 cm rectangular shape and (ii) a second portion which had a 1 cm×1 cm square shape and to which a lead wire was to be welded. To the second portion of the single piece thus cut off from the current collector, a lead wire, having a length of 6 cm and a width of 0.5 cm, was ultrasonically welded to obtain a probe electrode (measurement electrode) (FIG. 2). An aluminum probe electrode having a thickness of 20 μm was used to measure the capacitance of the positive electrode plate, and a copper probe electrode having a thickness of 20 μm was used to measure the capacitance of the negative electrode plate.

The probe electrode was laid over the first portion (portion having a 3 cm×3 cm square shape) of the electrode plate, whose capacitance was to be measured, to prepare a laminated body. The laminated body thus obtained was sandwiched between two sheets of silicon rubber. A resultant laminated body was further sandwiched between two SUS plates with a pressure of 0.7 MPa to obtain a laminated body which was to be subjected to the measurement. The lead wire of the electrode plate, whose capacitance was to be measured, and the lead wire of the probe electrode were drawn outside the laminated body which was to be subjected to the measurement. Each of a voltage terminal and an electric current terminal of the LCR meter was connected to those lead wires so that the voltage terminal was closer to the electrode plate than the electric current terminal.

(10) Ratio of Discharge Capacity in High-Rate Discharge with Respect to Design Capacity Discharge capacity characteristics of nonaqueous electrolyte secondary batteries (design capacity: 20.5 mAh) in high-rate measurement were measured by a method described in the following steps (A) and (B). The nonaqueous electrolyte secondary batteries were produced in Examples and Comparative Examples, respectively.

(A) Initial Charge and Discharge Test

A new nonaqueous electrolyte secondary battery, which had been produced in each of Examples and Comparative Examples but had not been subjected to any charge and discharge cycle, was subjected to four cycles of initial charge and discharge at 25° C. Each of the four cycles of the initial charge and discharge was carried out at a voltage ranging from 2.7 V to 4.1 V, with CC-CV charge at a charge current value of 0.2 C (terminal current condition: 0.02 C) and with CC discharge at a discharge current value of 0.2 C. An electric current value at which a battery rated capacity derived from a one-hour rate discharge capacity is discharged in one hour is defined as 1 C. Note that the "CC-CV charge" is a charging method in which (i) a battery is charged at a set constant electric current, and (ii) after a certain voltage is reached, the certain voltage is maintained while the electric current is being reduced. Note also that the "CC discharge" is a discharging method in which a battery is discharged at a set constant electric current until a certain voltage is reached. The same applies to the following description.

(B) High-Rate Discharge Capacity Characteristic (mAh)

The nonaqueous electrolyte secondary battery, which had been subjected to the above initial charge and discharge, was subjected to cycles of charge and discharge at 55° C. Each of the cycles of charge and discharge was carried out with CC-CV charge at a charge current value of 1 C (terminal current condition: 0.02 C) and with CC discharge at discharge current values varied in this order: 0.2 C, 1 C, 5 C, 10 C and 20 C. At each rate of the CC discharge, three cycles of charge and discharge was carried out. A voltage at this time was set in a range of 2.7 V to 4.2 V.

A discharge capacity in the third cycle of the three cycles with the CC discharge at 20 C was regarded as a discharge capacity (mAh) in high-rate measurement. Thereafter, the discharge capacity was divided by the design capacity of the nonaqueous electrolyte secondary battery. Table 1 shows a value obtained by this division.

Example 1

[Production of Nonaqueous Electrolyte Secondary Battery Laminated Separator]

First, 70% by weight of ultra-high molecular weight polyethylene powder (GUR4032, manufactured by Ticona Corporation) and 30% by weight of polyethylene wax (FNP-0115, manufactured by Nippon Seiro Co., Ltd.) having a weight-average molecular weight of 1,000 were prepared, i.e., 100 parts by weight of the ultra-high molecular weight polyethylene and the polyethylene wax in total were prepared. Then, with respect to 100 parts by weight of the ultra-high molecular weight polyethylene powder and the polyethylene wax in total, 0.4 parts by weight of an antioxidant (Irg1010, manufactured by Ciba Specialty Chemicals Corporation), 0.1 parts by weight of an antioxidant (P168, manufactured by Ciba Specialty Chemicals Corporation), and 1.3 parts by weight of sodium stearate were added. Then, a mixture thus obtained was mixed as it was, that is, in the form of powder, in a Henschel mixer at 440 rpm for 70 seconds. Then, calcium carbonate (manufactured by Maruo Calcium Co., Ltd.) having an average particle diameter of 0.1 μm was further added such that a volume of the calcium carbonate was 38% by volume with respect to the entire volume of a mixture obtained above by adding the antioxidants and the sodium stearate. Then, a resultant mixture was further mixed in a Henschel mixer at 440 rpm for 80 seconds. As a result, the resulting mixture, which was in a powder form, had an untamped density of approximately 500 g/L. The resulting mixture was then melt-kneaded in a twin screw kneading extruder. This produced a polyolefin resin composition.

Next, the polyolefin resin composition was rolled with use of a pair of rollers each having a surface temperature of 150° C. This produced a sheet of the polyolefin resin composition. This sheet was immersed in an aqueous hydrochloric acid solution (4 mol/L of hydrochloric acid and 0.5% by weight of nonionic surfactant) for removal of the calcium carbonate. The sheet was then stretched at a stretching ratio of 6.2 times in the TD at 100° C. Thereafter, the sheet was annealed at 120° C. (13° C. lower than 133° C., which is the melting point of a polyolefin resin contained in the sheet). This produced a porous film 1. The porous film 1 thus obtained had a puncture strength of 3.6 N.

An N-methyl-2-pyrrolidone (hereinafter referred to also as "NMP") solution (manufactured by Kureha Corporation; product name: L#9305, weight-average molecular weight: 1,000,000) containing a PVDF-based resin (polyvinylidene fluoride-hexafluoropropylene copolymer) was prepared as a coating solution. The coating solution was applied by a doctor blade method to the porous film 1 so that the PVDF-based resin in the coating solution thus applied to the porous film 1 weighed 6.0 g per square meter of the porous film 1.

The porous film 1, to which the coating solution had been applied, was immersed into 2-propanol while the coating film was wet with the solvent, and was then left to stand still at −10° C. for 5 minutes while the porous film 1 was kept immersed in the 2-propanol. This produced a laminated porous film 1. The laminated porous film 1 produced was further immersed into other 2-propanol while the laminated porous film 1 was wet with the above immersion solvent, and was then left to stand still at 25° C. for 5 minutes while the laminated porous film 1 was kept immersed in that other 2-propanol. This produced a laminated porous film 1a. The laminated porous film 1a produced was dried at 30° C. for 5 minutes. This produced a laminated separator 1 including the porous film 1 and a porous layer disposed on the porous film 1. Table 1 shows results of evaluation of the laminated separator 1.

[Preparation of Nonaqueous Electrolyte Secondary Battery]

(Preparation of Positive Electrode Plate)

A positive electrode plate was used which was produced by applying $LiNi_{0.5}Mn_{0.3}Co_{0.2}O_2$/electrically conductive agent/PVDF (weight ratio 92:5:3) to an aluminum foil. The aluminum foil was partially cut off so that a positive electrode active material layer was present in an area of 45 mm×30 mm and that this area with the positive electrode active material layer was surrounded by an area with a width of 13 mm in which area no positive electrode active material layer was present. This produced a positive electrode plate 1. The positive electrode active material layer had a thickness of 38 μm and a density of 2.50 g/cm$^3$.

(Preparation of Negative Electrode Plate)

A negative electrode plate was used which was produced by applying graphite/styrene-1,3-butadiene copolymer/sodium carboxymethyl cellulose (weight ratio 98:1:1) to a copper foil.

The copper foil was partially cut off so that a negative electrode active material layer was present in an area of 50 mm×35 mm and that this area with the negative electrode active material layer was surrounded by an area with a width of 13 mm in which area no negative electrode active material layer was present. This produced a negative electrode plate 1. The negative electrode active material layer had a thickness of 38 μm and a density of 1.49 g/cm$^3$.

(Assembly of Nonaqueous Electrolyte Secondary Battery)

A nonaqueous electrolyte secondary battery was produced by the following method with use of the positive electrode plate 1, the negative electrode plate 1, and the laminated separator 1.

The positive electrode plate 1, the laminated separator 1, and the negative electrode plate 1 were disposed (arranged) in this order in a laminate pouch, so that a nonaqueous electrolyte secondary battery member 1 was obtained. In so doing, the positive electrode plate 1 and the negative electrode plate 1 were arranged such that a main surface of the positive electrode active material layer of the positive electrode plate 1 was entirely included in a range of a main surface of the negative electrode active material layer of the negative electrode plate 1 (i.e., entirely covered by the main surface of the negative electrode active material layer of the negative electrode plate 1). Further, a surface of the laminated separator 1, which surface was on a porous layer side, was opposed to the positive electrode active material layer of the positive electrode plate 1.

Subsequently, the nonaqueous electrolyte secondary battery member 1 was put into a bag prepared in advance, which bag had been formed by a laminate of an aluminum layer and a heat seal layer. Further, 0.25 mL of a nonaqueous electrolyte was put into the bag. The above nonaqueous electrolyte was prepared by dissolving $LiPF_6$ in a mixed solvent of ethylene carbonate, ethyl methyl carbonate, and diethyl carbonate at a ratio of 3:5:2 (volume ratio) so that the $LiPF_6$ would be contained at 1 mol/L. The bag was then heat-sealed while the pressure inside the bag was reduced. This produced a nonaqueous electrolyte secondary battery 1.

Thereafter, the nonaqueous electrolyte secondary battery 1 obtained by the above method was subjected to measurement of a high-rate discharge capacity. Table 1 shows a result of the measurement.

Example 2

[Production of Nonaqueous Electrolyte Secondary Battery Laminated Separator]

First, 68.5% by weight of ultra-high molecular weight polyethylene powder (GUR4032, manufactured by Ticona Corporation) and 31.5% by weight of polyethylene wax (FNP-0115, manufactured by Nippon Seiro Co., Ltd.) having a weight-average molecular weight of 1,000 were prepared, i.e., 100 parts by weight of the ultra-high molecular weight polyethylene and the polyethylene wax in total were prepared. Then, 0.4 parts by weight of an antioxidant (Irg1010, manufactured by Ciba Specialty Chemicals Corporation), 0.1 parts by weight of an antioxidant (P168, manufactured by Ciba Specialty Chemicals Corporation), and 1.3 parts by weight of sodium stearate were added to 100 parts by weight of the ultra-high molecular weight polyethylene powder and the polyethylene wax in total. Then, a mixture thus obtained was mixed as it was, that is, in the form of powder, in a Henschel mixer at 440 rpm for 70 seconds. Then, calcium carbonate (manufactured by Maruo Calcium Co., Ltd.) having an average particle diameter of 0.1 μm was further added such that a volume of the calcium carbonate was 38% by volume with respect to the entire volume of a mixture obtained above by adding the antioxidants and the sodium stearate. Then, a resultant mixture was further mixed in a Henschel mixer at 440 rpm for 80 seconds. As a result, the resulting mixture, which was in a powder form, had an untamped density of approximately 500 g/L. The resulting mixture was then melt-kneaded in a twin screw kneading extruder. This produced a polyolefin resin composition.

Next, the polyolefin resin composition was rolled with use of a pair of rollers each having a surface temperature of 150° C. This produced a sheet of the polyolefin resin composition. This sheet was immersed in an aqueous hydrochloric acid solution (4 mol/L of hydrochloric acid and 0.5% by weight of nonionic surfactant) for removal of the calcium carbonate. The sheet was then stretched at a stretching ratio of 7.0 times in the TD at 100° C. Thereafter, the sheet was annealed at 123° C. (10° C. lower than 133° C., which is the melting point of a polyolefin resin contained in the sheet). This produced a porous film 2. The porous film 2 thus obtained had a puncture strength of 3.4 N.

Then, a surface of the porous film 2 was coated with a coating solution as in Example 1. The porous film 2, to which the coating solution had been applied, was immersed into 2-propanol while the coating film was wet with the solvent, and was then left to stand still at −5° C. for 5 minutes while the porous film 2 was kept immersed in the 2-propanol. This produced a laminated porous film 2. The laminated porous film 2 produced was further immersed into other 2-propanol while the laminated porous film 2 was wet with the above immersion solvent, and was then left to stand still at 25° C. for 5 minutes while the laminated porous film 2 was kept immersed in that other 2-propanol. This produced a laminated porous film 2a. The laminated porous film 2a produced was dried at 30° C. for 5 minutes. This produced a laminated separator 2 including the porous film 2 and a porous layer disposed on the porous film 2. Table 1 shows results of evaluation of the laminated separator 2.

[Preparation of Nonaqueous Electrolyte Secondary Battery]

A nonaqueous electrolyte secondary battery was prepared as in Example 1, except that the laminated separator 2 was used in place of the laminated separator 1. The nonaqueous electrolyte secondary battery thus prepared was referred to as a nonaqueous electrolyte secondary battery 2.

Thereafter, the nonaqueous electrolyte secondary battery 2 obtained by the above method was subjected to measurement of a high-rate discharge capacity. Table 1 shows a result of the measurement.

Example 3

(Preparation of Positive Electrode Plate)

A surface of a positive electrode plate, identical to the positive electrode plate 1, which surface was located on a positive electrode active material layer side was rubbed 3 times with use of an abrasive cloth sheet (model: TYPE AA GRIT No. 100) manufactured by Nagatsuka Abrasive Mfg. Co. Ltd. Consequently, a positive electrode plate 2 was obtained. In the positive electrode plate 2, a positive electrode active material layer had a thickness of 38 μm and a porosity of 40%.

[Preparation of Nonaqueous Electrolyte Secondary Battery]

A nonaqueous electrolyte secondary battery was prepared as in Example 1, except that the laminated separator 2 was used in place of the laminated separator 1 and that the positive electrode plate 2 was used as a positive electrode plate. In other words, the negative electrode plate 1 was used as a negative electrode plate. The nonaqueous electrolyte secondary battery thus prepared was referred to as a nonaqueous electrolyte secondary battery 3.

Thereafter, the nonaqueous electrolyte secondary battery 3 obtained by the above method was subjected to measurement of a high-rate discharge capacity. Table 1 shows a result of the measurement.

Example 4

(Preparation of Positive Electrode Plate)

A surface of a positive electrode plate, identical to the positive electrode plate 1, which surface was located on a positive electrode active material layer side was rubbed 5 times with use of an abrasive cloth sheet (model: TYPE AA GRIT No. 100) manufactured by Nagatsuka Abrasive Mfg. Co. Ltd. Consequently, a positive electrode plate 3 was obtained. In the positive electrode plate 3, a positive electrode active material layer had a thickness of 38 μm and a porosity of 40%.

[Preparation of Nonaqueous Electrolyte Secondary Battery]

A nonaqueous electrolyte secondary battery was prepared as in Example 1, except that the laminated separator 2 was used in place of the laminated separator 1 and that the positive electrode plate 3 was used as a positive electrode plate. In other words, the negative electrode plate 1 was used as a negative electrode plate. The nonaqueous electrolyte secondary battery thus prepared was referred to as a nonaqueous electrolyte secondary battery 4.

Thereafter, the nonaqueous electrolyte secondary battery 4 obtained by the above method was subjected to measurement of a high-rate discharge capacity. Table 1 shows a result of the measurement.

Example 5

(Preparation of Negative Electrode Plate)

A surface of a negative electrode plate, identical to the negative electrode plate 1, which surface was located on a negative electrode active material layer side was rubbed 3 times with use of an abrasive cloth sheet (model: TYPE AA GRIT No. 100) manufactured by Nagatsuka Abrasive Mfg. Co. Ltd. Consequently, a negative electrode plate 2 was obtained. In the negative electrode plate 2, a negative electrode active material layer had a thickness of 38 μm and a porosity of 31%.

[Preparation of Nonaqueous Electrolyte Secondary Battery]

A nonaqueous electrolyte secondary battery was prepared as in Example 1, except that the laminated separator 2 was used in place of the laminated separator 1 and that the negative electrode plate 2 was used as a negative electrode plate. In other words, the positive electrode plate 1 was used as a positive electrode plate. The nonaqueous electrolyte secondary battery thus prepared was referred to as a nonaqueous electrolyte secondary battery 5.

Thereafter, the nonaqueous electrolyte secondary battery 5 obtained by the above method was subjected to measurement of a high-rate discharge capacity. Table 1 shows a result of the measurement.

Example 6

(Preparation of Negative Electrode Plate)

A surface of a negative electrode plate, identical to the negative electrode plate 1, which surface was located on a negative electrode active material layer side was rubbed 7 times with use of an abrasive cloth sheet (model: TYPE AA GRIT No. 100) manufactured by Nagatsuka Abrasive Mfg. Co. Ltd. Consequently, a negative electrode plate 3 was obtained. In the negative electrode plate 3, a negative electrode active material layer had a thickness of 38 μm and a porosity of 31%.

[Preparation of Nonaqueous Electrolyte Secondary Battery]

A nonaqueous electrolyte secondary battery was prepared as in Example 1, except that the laminated separator 2 was used in place of the laminated separator 1 and that the negative electrode plate 3 was used as a negative electrode plate. In other words, the positive electrode plate 1 was used as a positive electrode plate. The nonaqueous electrolyte secondary battery thus prepared was referred to as a nonaqueous electrolyte secondary battery 6.

Thereafter, the nonaqueous electrolyte secondary battery 6 obtained by the above method was subjected to measurement of a high-rate discharge capacity. Table 1 shows a result of the measurement.

Example 7

[Preparation of Porous Layer and Laminated Separator]

In N-methyl-2-pyrrolidone, a PVDF-based resin (manufactured by Arkema Inc.; product name "Kynar (registered trademark) LBG"; weight-average molecular weight of 590,000) was stirred and dissolved at 65° C. for 30 minutes so that a solid content was 10% by mass. A resultant solution was used as a binder solution. As a filler, alumina fine particles (manufactured by Sumitomo Chemical Co., Ltd.; product name "AKP3000"; containing 5 ppm of silicon) was used. The alumina fine particles, the binder solution, and a solvent (N-methyl-2-pyrrolidone) were mixed together so as to be in the following proportion. That is, the alumina fine particles, the binder solution, and the solvent were mixed together so that (i) a resultant mixed solution contained 10 parts by weight of the PVDF-based resin with respect to 90 parts by weight of the alumina fine particles, and (ii) a solid content concentration (alumina fine particles+PVDF-based resin) of the mixed solution was 10% by weight. A dispersion solution was thus obtained. The dispersion solution was applied as a coating solution by a doctor blade method to the porous film 2, which was prepared in Example 2, so that the PVDF-based resin in the coating solution thus applied to the porous film 2 weighed 6.0 g per square meter of the porous film 2. This produced a laminated porous film 3. The laminated porous film 3 was dried at 65° C. for 5 minutes. This produced a laminated separator 3 including the porous film 2 and a porous layer disposed on the porous film 2. The direction of hot air for drying here was arranged to be perpendicular to a base material and the velocity of the hot air for the drying was set to 0.5 m/s. Table 1 shows results of evaluation of the laminated separator 3.

[Preparation of Nonaqueous Electrolyte Secondary Battery]

A nonaqueous electrolyte secondary battery was prepared as in Example 1, except that the laminated separator 3 was used in place of the laminated separator 1. The nonaqueous electrolyte secondary battery thus prepared was referred to as a nonaqueous electrolyte secondary battery 7.

Thereafter, the nonaqueous electrolyte secondary battery 7 obtained by the above method was subjected to measurement of a high-rate discharge capacity. Table 1 shows a result of the measurement.

Comparative Example 1

(Preparation of Positive Electrode Plate)

A surface of a positive electrode plate, identical to the positive electrode plate 1, which surface was located on a positive electrode active material layer side was rubbed 10 times with use of an abrasive cloth sheet (model: TYPE AA GRIT No. 100) manufactured by Nagatsuka Abrasive Mfg. Co. Ltd. Consequently, a positive electrode plate 4 was obtained. In the positive electrode plate 4, a positive electrode active material layer had a thickness of 38 μm and a porosity of 40%.

[Preparation of Nonaqueous Electrolyte Secondary Battery]

A nonaqueous electrolyte secondary battery was prepared as in Example 1, except that the laminated separator 2 was used in place of the laminated separator 1 and that the positive electrode plate 4 was used as a positive electrode plate. In other words, the negative electrode plate 1 was used as a negative electrode plate. The nonaqueous electrolyte secondary battery thus prepared was referred to as a nonaqueous electrolyte secondary battery 8.

Thereafter, the nonaqueous electrolyte secondary battery 8 obtained by the above method was subjected to measurement of a high-rate discharge capacity. Table 1 shows a result of the measurement.

Comparative Example 2

(Preparation of Negative Electrode Plate)

A surface of a negative electrode plate, identical to the negative electrode plate 1, which surface was located on a negative electrode active material layer side was rubbed 10 times with use of an abrasive cloth sheet (model: TYPE AA GRIT No. 100) manufactured by Nagatsuka Abrasive Mfg. Co. Ltd. Consequently, a negative electrode plate 4 was obtained. In the negative electrode plate 4, a negative electrode active material layer had a thickness of 38 μm and a porosity of 31%.

[Preparation of Nonaqueous Electrolyte Secondary Battery]

A nonaqueous electrolyte secondary battery was prepared as in Example 1, except that the laminated separator 2 was used in place of the laminated separator 1 and that the negative electrode plate 4 was used as a negative electrode plate. In other words, the positive electrode plate 1 was used as a positive electrode plate. The nonaqueous electrolyte secondary battery thus prepared was referred to as a nonaqueous electrolyte secondary battery 9.

Thereafter, the nonaqueous electrolyte secondary battery 9 obtained by the above method was subjected to measurement of a high-rate discharge capacity. Table 1 shows a result of the measurement.

Comparative Example 3

[Preparation of Nonaqueous Electrolyte Secondary Battery Laminated Separator]

A porous film 2, which has been produced as in Example 2 and to which a coating solution had been applied as in Example 2, was immersed into 2-propanol while the coating film was wet with the solvent, and was then left to stand still at −78° C. for 5 minutes while the porous film 2 was kept immersed in the 2-propanol. This produced a laminated porous film 4. The laminated porous film 4 produced was further immersed into other 2-propanol while the laminated porous film 4 was wet with the above immersion solvent, and was then left to stand still at 25° C. for 5 minutes while the laminated porous film 4 was kept immersed in that other 2-propanol. This produced a laminated porous film 4a. The laminated porous film 4a produced was dried at 30° C. for 5 minutes. This produced a laminated separator 4 including the porous film 2 and a porous layer disposed on the porous film 2. Table 1 shows results of evaluation of the laminated separator 4.

[Preparation of Nonaqueous Electrolyte Secondary Battery]

A nonaqueous electrolyte secondary battery was prepared as in Example 1, except that the laminated separator 4 was used in place of the laminated separator 1. The nonaqueous electrolyte secondary battery thus prepared was referred to as a nonaqueous electrolyte secondary battery 10.

Thereafter, the nonaqueous electrolyte secondary battery 10 obtained by the above method was subjected to measurement of a high-rate discharge capacity. Table 1 shows a result of the measurement.

TABLE 1

| | Laminated separator | | Electrodes | | Battery Ratio of 20 |
|---|---|---|---|---|---|
| | Porous film Parameter X | Porous layer PVDF α ratio (mol %) | Positive electrode plate Capacitance (nF) | Negative electrode plate Capacitance (nF) | C discharge capacity with respect to design capacity |
| Example 1 | 15.8 | 35.3 | 2.1 | 4.7 | 66% |
| Example 2 | 2.3 | 44.4 | 2.1 | 4.7 | 52% |
| Example 3 | 2.3 | 44.4 | 60 | 4.7 | 56% |
| Example 4 | 2.3 | 44.4 | 935 | 4.7 | 56% |
| Example 5 | 2.3 | 44.4 | 2.1 | 274 | 54% |
| Example 6 | 2.3 | 44.4 | 2.1 | 7400 | 51% |
| Example 7 | 2.3 | 64.3 | 2.1 | 4.7 | 54% |
| Comparative Example 1 | 2.3 | 44.4 | 4090 | 4.7 | 30% |
| Comparative Example 2 | 2.3 | 44.4 | 2.1 | 9050 | 23% |
| Comparative Example 3 | 2.3 | 34.6 | 2.1 | 4.7 | 35% |

As shown in Table 1, the nonaqueous electrolyte secondary batteries produced in Examples 1 to 7, respectively, each have an enhanced discharge capacity in high-rate discharge with respect to a design capacity of the battery, as compared to nonaqueous electrolyte secondary batteries produced in Comparative Examples 1 to 3, respectively.

It is therefore clear from the above that a nonaqueous electrolyte secondary battery can have a better discharge capacity characteristic in high-rate discharge, when the nonaqueous electrolyte secondary battery satisfies the following four requirements: (i) the polyvinylidene fluoride-based resin contained in the porous layer is arranged such that the content of the α-form polyvinylidene fluoride-based resin is not less than 35.0 mol % with respect to 100 mol % of the total content of the α-form polyvinylidene fluoride-based resin and the β-form polyvinylidene fluoride-based resin in the polyvinylidene fluoride-based resin; (ii) the positive electrode plate has a capacitance of not less than 1 nF and not more than 1000 nF per measurement area of 900 mm$^2$; (iii) the negative electrode plate has a capacitance of not less than 4 nF and not more than 8500 nF per measurement area of 900 mm$^2$; and (iv) the parameter X of the polyolefin porous film is not more than 20.

INDUSTRIAL APPLICABILITY

A nonaqueous electrolyte secondary battery in accordance with an embodiment of the present invention has an excellent discharge capacity characteristic in high-rate discharge. The nonaqueous electrolyte secondary battery is therefore suitable for use as (i) batteries for use in devices such as a personal computer, a mobile telephone, and a portable information terminal and (ii) on-vehicle batteries.

The invention claimed is:

1. A nonaqueous electrolyte secondary battery comprising:
a nonaqueous electrolyte secondary battery separator including a polyolefin porous film;
a porous layer containing a polyvinylidene fluoride-based resin;
a positive electrode plate having a capacitance of not less than 1 nF and not more than 1000 nF per measurement area of 900 mm$^2$; and
a negative electrode plate having a capacitance of not less than 4 nF and not more than 8500 nF per measurement area of 900 mm$^2$,
the polyolefin porous film having a parameter X of not more than 20, the parameter X being calculated in accordance with the following expression:

$$X = 100 \times |\text{MD tan }\delta - \text{TD tan }\delta|/\{(\text{MD tan }\delta + \text{TD tan }\delta)/2\}$$

where MD tan δ represents a tan δ in a machine direction and TD tan δ represents a tan δ in a transverse direction, the tan δ in the machine direction and the tan δ in the transverse direction each being obtained through a viscoelasticity measurement performed at a frequency of 10 Hz and at a temperature of 90° C., the porous layer being provided between the nonaqueous electrolyte secondary battery separator and at least one of the positive electrode plate and the negative electrode plate, the polyvinylidene fluoride-based resin contained in the porous layer containing an α-form polyvinylidene fluoride-based resin and a β-form polyvinylidene fluoride-based resin, a content of the α-form polyvinylidene fluoride-based resin being not less than 35.0 mol % with respect to 100 mol % of a total content of the α-form polyvinylidene fluoride-based resin and the β-form polyvinylidene fluoride-based resin in the polyvinylidene fluoride-based resin, the content of the α-form polyvinylidene fluoride-based resin being calculated by (a) waveform separation of (α/2) observed at around −78 ppm in a $^{19}$F-NMR spectrum obtained from the porous layer and (b) waveform separation of {(α/2)+β} observed at around −95 ppm in the $^{19}$F-NMR spectrum obtained from the porous layer.

2. The nonaqueous electrolyte secondary battery as set forth in claim 1, wherein the positive electrode plate contains a transition metal oxide.

3. The nonaqueous electrolyte secondary battery as set forth in claim 1, wherein the negative electrode plate contains graphite.

4. The nonaqueous electrolyte secondary battery as set forth in claim 1, further comprising:

another porous layer which is provided between (i) the nonaqueous electrolyte secondary battery separator and (ii) at least one of the positive electrode plate and the negative electrode plate.

5. The nonaqueous electrolyte secondary battery as set forth in claim 4, wherein the another porous layer contains at least one kind of resin selected from the group consisting of polyolefins, (meth)acrylate-based resins, fluorine-containing resins (excluding polyvinylidene fluoride-based resins), polyamide-based resins, polyester-based resins and water-soluble polymers.

6. The nonaqueous electrolyte secondary battery as set forth in claim 5, wherein the polyamide-based resin is an aramid resin.

* * * * *